US009883441B2

(12) United States Patent
Rinne et al.

(10) Patent No.: US 9,883,441 B2
(45) Date of Patent: Jan. 30, 2018

(54) METHOD AND APPARATUS TO ROUTE PACKET FLOWS OVER TWO TRANSPORT RADIOS

(75) Inventors: Mika Rinne, Espoo (FI); Jarkko Koskela, Oulu (FI); Sami Kekki, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 14/357,182

(22) PCT Filed: Nov. 10, 2011

(86) PCT No.: PCT/IB2011/055036
§ 371 (c)(1),
(2), (4) Date: Aug. 5, 2014

(87) PCT Pub. No.: WO2013/068787
PCT Pub. Date: May 16, 2013

(65) Prior Publication Data
US 2014/0369198 A1    Dec. 18, 2014

(51) Int. Cl.
*H04W 36/22* (2009.01)
*H04W 40/02* (2009.01)
(Continued)

(52) U.S. Cl.
CPC ............. *H04W 36/22* (2013.01); *H04L 45/16* (2013.01); *H04L 45/245* (2013.01); *H04L 47/34* (2013.01);
(Continued)

(58) Field of Classification Search
CPC ..... H04W 88/06; H04W 40/02; H04W 36/22; H04W 12/04; H04W 36/08; H04W 76/02;
(Continued)

(56) References Cited

U.S. PATENT DOCUMENTS 9,198,021 B2 * 11/2015 Tomici ................. H04W 8/082
2009/0046631 A1 * 2/2009 Meylan ................ H04W 80/02
370/328
(Continued)

FOREIGN PATENT DOCUMENTS

CN    101094448 A    12/2007
CN    101841880 A     9/2010
(Continued)

OTHER PUBLICATIONS

"New Study Item Proposal for Radio Level Dynamic Flow Switching Between 3GPP-LTE and WLAN", 3GPP TSG RAN#53, RP-111104, Agenda item: 13.2.1, Intel Corporation, Sep. 13-16, 2011, 5 pages.
(Continued)

*Primary Examiner* — Jung-Jen Liu
(74) *Attorney, Agent, or Firm* — Harrington & Smith

(57) ABSTRACT

A method includes receiving packets of a flow at a packet data convergence protocol layer; and based on at least one criterion, routing the flow to one or both of at least one cellular transport radio and a wireless local area network transport radio. Another method includes receiving at a packet data network gateway from an S 1 interface a dynamic host configuration protocol request for a station; one of creating an internet protocol configuration for the station or generating another dynamic host configuration protocol request to a dynamic host configuration protocol server to obtain the internet protocol configuration; and delivering the internet protocol configuration to the station. Apparatus for performing the methods are also disclosed, as are computer-readable program storage devices.

20 Claims, 14 Drawing Sheets

(51) Int. Cl.
  *H04L 12/761* (2013.01)
  *H04L 12/709* (2013.01)
  *H04L 12/801* (2013.01)
  *H04W 12/04* (2009.01)
  *H04W 88/06* (2009.01)

(52) U.S. Cl.
  CPC ............ *H04W 40/02* (2013.01); *H04W 12/04* (2013.01); *H04W 88/06* (2013.01)

(58) Field of Classification Search
  CPC ...... H04W 74/08; H04L 45/16; H04L 45/245; H04L 47/34; H04L 1/1848; H04L 1/1809
  See application file for complete search history.

(56) References Cited

U.S. PATENT DOCUMENTS

| | | | |
|---|---|---|---|
| 2009/0104890 A1* | 4/2009 | Wang | H04W 12/02 455/410 |
| 2009/0163211 A1* | 6/2009 | Kitazoe | H04W 74/004 455/436 |
| 2009/0213729 A1 | 8/2009 | Zhang et al. | |
| 2009/0286541 A1* | 11/2009 | Maheshwari | H04W 76/02 455/436 |
| 2010/0157904 A1* | 6/2010 | Ho | H04W 80/02 370/328 |
| 2010/0026009 A1 | 10/2010 | Ulupinar et al. | |
| 2010/0260096 A1 | 10/2010 | Ulupinar et al. | 370/316 |
| 2010/0272007 A1* | 10/2010 | Shen | H04B 7/2606 370/315 |
| 2010/0322426 A1* | 12/2010 | Keevill | H04L 12/5692 380/270 |
| 2010/0323714 A1* | 12/2010 | Schmidt | H04W 48/18 455/456.1 |
| 2011/0044218 A1* | 2/2011 | Kaur | H04W 72/1215 370/310 |
| 2011/0075557 A1 | 3/2011 | Chowdhury et al. | |
| 2011/0075675 A1* | 3/2011 | Koodli | H04L 12/14 370/401 |
| 2011/0235802 A1 | 9/2011 | Kokkinen et al. | |
| 2011/0280204 A1* | 11/2011 | Nourbakhsh | H04W 88/06 370/329 |
| 2011/0294474 A1* | 12/2011 | Barany | H04W 8/005 455/414.1 |
| 2012/0071168 A1* | 3/2012 | Tomici | H04W 76/025 455/445 |
| 2013/0083661 A1* | 4/2013 | Gupta | H04W 28/0215 370/235 |
| 2014/0003378 A1* | 1/2014 | Sipola | H04W 28/065 370/329 |

FOREIGN PATENT DOCUMENTS

| | | |
|---|---|---|
| EP | 1871054 A1 | 12/2007 |
| EP | 2291048 A1 | 3/2011 |
| WO | 2009/059066 A1 | 5/2009 |
| WO | 2011/022570 A1 | 2/2011 |
| WO | 2011069096 A2 | 6/2011 |
| WO | 2011133934 A1 | 10/2011 |

OTHER PUBLICATIONS

"Discussions on Carrier Aggregation Across LTE and WIFI", 3GPP TSG-RAN meeting #53, RP-111094, Agenda item: 13.2.1, Intel Corporation, Sep. 13-16, 2011, 4 pages.

Aoude et al., "Design and Analysis of UMTS-WLAN Interoperability and Service Continuity Using the SIP Protocol", International Conference on Advances in Computational Tools for Engineering Applications, Jul. 15-17, 2009, pp. 269-274.

Naik, "LTE WLAN Interworking for Wi-fi Hotspots", Second International Conference on Communication Systems and Networks, Jan. 5-9, 2010, 2 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300, V10.5.0, Sep. 2011, pp. 1-194.

"3rd Generation Partnership Project; Technical Specification Group Radio Access Network; Requirements for further advancements for Evolved Universal Terrestrial Radio Access (E-UTRA) (LTE-Advanced) (Release 10)", 3GPP TR 36.913, V10.0.0, Mar. 2011, pp. 1-15.

"3rd Generation Partnership Project; Technical Specification Group Radio Access Network; Feasibility study for Further Advancements for E-UTRA (LTE-Advanced) (Release 10)", 3GPP TR 36.912, V10.0.0, Mar. 2011, pp. 1-62.

"3rd Generation Partnership Project; Technical Specification Group Radio Access Network; Evolved Universal Terrestrial Radio Access (E-UTRA); Packet Data Convergence Protocol (PDCP) specification (Release 10)", 3GPP TS 36.323, V10.1.0, Mar. 2011, pp. 1-26.

"3rd Generation Partnership Project; Technical Specification Group Radio Access Network; Evolved Universal Terrestrial Radio Access Network (E-UTRAN); S1 data transport (Release 10)", 3GPP TS 36.414, V10.1.0, Jun. 2011, pp. 1-8.

"3rd Generation Partnership Project; Technical Specification Group Core Network and Terminals; General Packet Radio System (GPRS) Tunnelling Protocol User Plane (GTPv1-U) (Release 11)", 3GPP TS 29.281, V11.6.0, Mar. 2013, pp. 1-27.

"3rd Generation Partnership Project;Technical Specification Group Core Network and Terminals; General Packet Radio Service (GPRS); GPRS Tunnelling Protocol (GTP) across the Gn and Gp interface (Release 11)", 3GPP TS 29.060, V11.0.0, Sep. 2011, pp. 1-169.

"3rd Generation Partnership Project; Technical Specification Group Core Network and Terminals; Universal Subscriber Identity Module (USIM) Application Toolkit (USAT) (Release 10)", 3GPP TS 31.111, V10.4.0, Oct. 2011, pp. 1-120.

"3rd Generation Partnership Project; Technical Specification Group Core Network and Terminals; Characteristics of the Universal Subscriber Identity Module (USIM) application(Release 11)", 3GPP TS 31.102, V11.0.0, Oct. 2011, pp. 1-227.

Aboba et al., "Extensible Authentication Protocol (EAP) Key Management Framework", RFC 5247, Network Working Group, Aug. 2008, pp. 1-79.

"3rd Generation Partnership Project;Technical Specification Group Core Network and Terminals;Access Network Discovery and Selection Function (ANDSF) Management Object (MO) (Release 11)", 3GPP TS 24.312, V11.0.0, Sep. 2011, pp. 1-157.

"3rd Generation Partnership Project;Technical Specification Group Services and System Aspects;Data Identification in ANDSF (DIDA); (Release 11)", 3GPP TR 23.855, V0.3.0, Oct. 2011, pp. 1-11.

"3rd Generation Partnership Project;Technical Specification Group Services and System Aspects;Operator Policies for IP Interface Selection (OPIIS); (Release 11)", 3GPP TR 23.853, V0.3.1, Aug. 2011, pp. 1-12.

Gundavelli et al., "Proxy Mobile IPv6", RFC 5213, Network Working Group, Aug. 2008, pp. 1-92.

"3rd Generation Partnership Project;Technical Specification Group Services and System Aspects;Architecture enhancements for non-3GPP accesses(Release 11)", 3GPP TS 23.402, V11.0.0, Sep. 2011, pp. 1-232.

"3rd Generation Partnership Project;Technical Specification Group Radio Access Network;Evolved Universal Terrestrial Radio Access (E-UTRA); Radio Resource Control (RRC); Protocol specification (Release 10)", 3GPP TS 36.331, V10.3.0, Sep. 2011, pp. 1-296.

"3rd Generation Partnership Project;Technical Specification Group Radio Access Network;Evolved Universal Terrestrial Radio Access (E-UTRA);Medium Access Control (MAC) protocol specification(Release 10)", 3GPP TS 36.321, V10.3.0, Sep. 2011, pp. 1-54.

"3rd Generation Partnership Project;Technical Specification Group Services and System Aspects;General Packet Radio Service (GPRS)

(56) References Cited

OTHER PUBLICATIONS enhancements for Evolved Universal Terrestrial Radio Access Network (E-UTRAN) access (Release 10)", 3GPP TS 23.401, V10.5.0, Sep. 2011, pp. 1-282.
Korhonen et al., "IPv6 in 3GPP Evolved Packet System", draft-ietf-v6ops-3gpp-eps-08, Internet-Draft, Sep. 30, 2011, pp. 1-35.
Extended European Search Report received for corresponding European Patent Application No. 11875453.0, dated Jun. 3, 2015, 8 pages.
"On Inter-site Multi-Point Transmission in HSDPA", 3GPP TSG RAN WG2 Meeting #75-BIS, R2-115196, Agenda item: 10.4.3, QUALCOMM Incorporated, Oct. 10-14, 20111, pp. 1-5.
International Search Report received for corresponding Patent Cooperation Treaty Application No. PCT/IB2011/055036, dated Apr. 10, 2012 , 5 pages.

\* cited by examiner

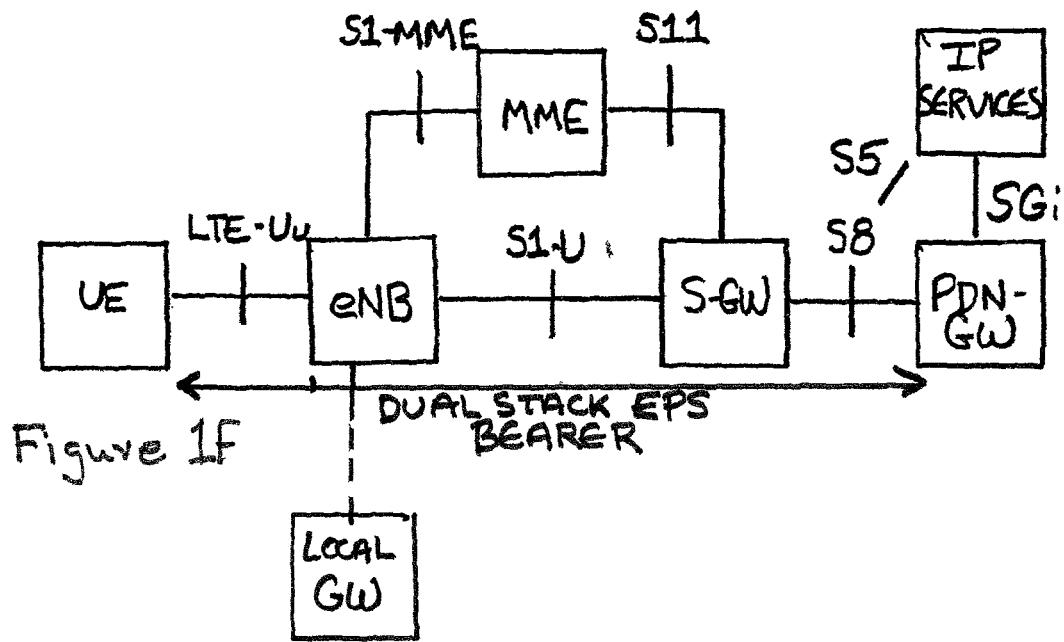

| GTP-u TEID | Flow via LTE | GTP-u TEID | Flow via Wi-Fi |

Figure 11A

| GTP-u TEID | Flow via LTE or Wi-Fi or both |

Figure 11B

| GTP-u TEID | Flow via LTE | IP | Flow via Wi-Fi |

Figure 11C

METHOD AND APPARATUS TO ROUTE PACKET FLOWS OVER TWO TRANSPORT RADIOS

RELATED APPLICATION

This application was originally filed as PCT Application No. PCT/IB2011/055036 filed Nov. 10, 2011.

TECHNICAL FIELD

The exemplary and non-limiting embodiments of this invention relate generally to wireless communication systems, methods, devices and computer programs and, more specifically, relate to traffic flow switching (offloading) between a cellular radio and a wireless local area network (WLAN) radio, where the cellular radio can be compliant with, for example, LTE/LTE-A and the WLAN radio can be compliant with, for example, WiFi.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
Wi-Fi Wireless Fidelity, the wireless local area network (WLAN) technology based on the IEEE 802.11 standard. IEEE 802.11 covers technologies certified as IEEE 802.11a/b/g/n/ac/ad/af/s/i/v for example.
AP Wi-Fi access point
APN access point name
DHCP dynamic host configuration protocol
eNB evolved NodeB, base station in a LTE/LTE-A network
EPS evolved packet system
GTP general packet radio service tunnel
GTP-u GTP tunnel for user plane traffic
LTE Long Term Evolution, a technology standardized by 3GPP
LTE-A LTE-Advanced, a technology evolution step of LTE standardized by 3GPP
NAS non-access stratum
PDCP packet data convergence protocol
PDN GW packet data network gateway, a gateway in a mobile operator's network to service network connectivity of a UE
SDU service data unit
STA Wi-Fi station
TEID tunnel endpoint identifier of the GTP-u tunnel
UE user equipment, e.g., a cellular phone, smart phone, computing device such as a tablet
USIM universal subscriber identity module
Additional abbreviations that may appear in the description or drawings include:
ARQ automatic repeat request
DL downlink (eNB towards UE)
eNB E-UTRAN Node B (evolved Node B)
EPC evolved packet core
E-UTRAN evolved UTRAN (LTE)
GGSN gateway GPRS support node
GPRS general packet radio service
HARQ hybrid automatic repeat request
IMTA international mobile telecommunications association
ITU-R international telecommunication union-radiocommunication sector
MAC medium access control (layer 2, L2)
MM/MME mobility management/mobility management entity
OFDMA orthogonal frequency division multiple access
O&M operations and maintenance
PDCP packet data convergence protocol
PHY physical (layer 1, L1)
Rel release
RLC radio link control
RRC radio resource control
RRM radio resource management
SGSN serving GPRS support node
S-GW serving gateway
SC-FDMA single carrier, frequency division multiple access
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300 V10.5.0 (2011-09) *Technical Specification* 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) incorporated by reference herein in its entirety and referred to for simplicity hereafter as 3GPP TS 36.300.

FIG. 1A reproduces Figure 4.1 of 3GPP TS 36.300 and shows the overall architecture of the EUTRAN system (Rel-8). The E-UTRAN system includes eNBs, providing the E-UTRAN user plane (u-Plane, PDCP/RLC/MAC/PHY) and control plane (c_Plane, RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Also of interest herein are the further releases of 3GPP LTE (e.g., LTE Rel-10) targeted towards future IMT-A systems, referred to herein for convenience simply as LTE-Advanced (LTE-A).

Reference in this regard may be made to 3GPP TR 36.913 V10.0.0 (2011-03) *Technical Report* 3rd Generation Partnership Project; Technical Specification Group Radio Access Network; Requirements for further advancements for Evolved Universal Terrestrial Radio Access (E-UTRA) (LTE-Advanced)(Release 10). Reference can also be made to 3GPP TR 36.912 V10.0.0 (2011-03) *Technical Report* 3rd Generation Partnership Project; Technical Specification Group Radio Access Network; Feasibility study for Further Advancements for E-UTRA (LTE-Advanced) (Release 10).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

Section 4.3.1 of 3GPP TS 36.300, entitled User plane, shows in Figure 4.3.1-1: user-plane protocol stack (reproduced herein as FIG. 1B), the protocol stack for the user-plane, where PDCP, RLC and MAC sublayers (terminated in the eNB on the network side) perform the functions listed for the user plane in subclause 6, e.g. header compression, ciphering, scheduling, ARQ and HARQ. These protocols also serve the transport of the control plane.

Section 4.3.2 of 3GPP TS 36.300, entitled Control plane, shows in Figure 4.3.2-1 the control-plane protocol stack (reproduced herein as FIG. 1C), where the PDCP sublayer (terminated in the eNB on the network side) performs the functions listed for the control plane in subclause 6, e.g. ciphering and integrity protection. The RLC and MAC sublayers (terminated in the eNB on the network side) perform the same functions as for the user plane, the RRC (terminated in the eNB on the network side) performs the functions listed in subclause 7, e.g.: Broadcast; Paging; RRC connection management; RB (radio bearer) control; Mobility functions; and UE measurement reporting and control. The NAS control protocol (terminated in the MME on the network side) performs among other things: EPS bearer management; Authentication; ECM-IDLE mobility handling; Paging origination in ECM-IDLE; and Security control.

Also of interest herein is 3GPP TS 36.323 V10.1.0 (2011-03) *Technical Specification* 3rd Generation Partnership Project; Technical Specification Group Radio Access Network; Evolved Universal Terrestrial Radio Access (E-UTRA); Packet Data Convergence Protocol (PDCP) specification (Release 10). FIG. 1D reproduces Figure 4.2.2.1 of 3GPP TS 36.323 and shows a functional view of the PDCP layer.

Also of interest herein is 3GPP TS 36.414 V10.1.0 (2011-06) Technical Specification 3rd Generation Partnership Project; Technical Specification Group Radio Access Network; Evolved Universal Terrestrial Radio Access Network (E-UTRAN); S1 data transport (Release 10). FIG. 1E herein reproduces Figure 6.1: Transport network layer for data streams over S1 of 3GPP TS 36.414 and shows the transport protocol stacks over 51. The transport layer for data streams over S1 is an IP based Transport. The GTP-U (3GPP TS 29.281) protocol over UDP over IP is supported as the transport for data streams on the S1 interface. The transport bearer is identified by the GTP-U TEID (3GPP TS 29.281) and the IP address (source TEID, destination TEID, source IP address, destination IP address).

One benefit of offloading 3GPP LTE traffic to Wi-Fi is the availability of large amounts of license-exempt band frequencies for the traffic.

A problem that is encountered when considering offloading 3GPP LTE traffic to Wi-Fi is that LTE and Wi-Fi are completely different kinds of radios and, in addition, they use network connectivity protocols in different ways.

Even if Wi-Fi is used here to describe the Wireless Local Area Network, it may be possible to have another local area radio working in this type of a role. It is foreseen that 3GPP in the future may define an evolved local area radio technology that is compatible to the LTE/LTE-A radio interface but operates otherwise in a similar role as Wi-Fi.

This kind of an evolved local area radio may use a license-exempt frequency band, as in Wi-Fi, but it may as well be designed to use other bands, currently not available to cellular operators, such as spectrum bands that will become available via authorized shared access principles, cognitivity principles, flexible spectrum use principles and principles applicable to use of white spaces (e.g., unused spectrum between broadcast media bands), or any other new spectrum that becomes locally available. These kinds of opportunities for new spectrum for local use may actually make available large amounts of spectrum that would otherwise not be available for communications, and possibly for other purposes of spectrum use.

SUMMARY

The foregoing and other problems are overcome, and other advantages are realized, by the use of the exemplary embodiments of this invention.

In a first aspect thereof the exemplary embodiments of this invention provide a method that includes receiving packets of a flow at a packet data convergence protocol layer; and based on at least one criterion, routing the flow to one or both of at least one cellular transport radio and a wireless local area network transport radio.

In another aspect thereof the exemplary embodiments of this invention provide an apparatus that comprises at least one data processor and at least one memory including computer program code. In the apparatus the at least one memory and computer program code are configured, with the at least one data processor, to cause the apparatus at least to receive packets of a flow at a packet data convergence protocol layer and, based on at least one criterion, to route the flow to one or both of at least one cellular transport radio and a wireless local area network transport radio.

In a further aspect thereof the exemplary embodiments of this invention provide an apparatus that includes means for receiving packets of a flow at a packet data convergence protocol layer; and means responsive to at least one criterion for routing the flow to one or both of at least one cellular transport radio and a wireless local area network transport radio.

In another aspect thereof the exemplary embodiments of this invention provide a method that includes receiving at a packet data network gateway from an S1 interface a dynamic host configuration protocol request for a station; and one of creating an internet protocol configuration for the station or generating another dynamic host configuration protocol request to a dynamic host configuration protocol server to obtain the internet protocol configuration. The packet data network gateway further delivers the internet protocol configuration to the station.

In still another aspect thereof the exemplary embodiments of this invention provide an apparatus that includes at least one data processor and at least one memory including computer program code. The at least one memory and computer program code are configured, with the at least one data processor, to cause the apparatus at least to receive at a packet data network gateway from an S1 a dynamic host configuration protocol request for a station; and to one of create an internet protocol configuration for the station or generate another dynamic host configuration protocol request to a dynamic host configuration protocol server to obtain the internet protocol configuration. The packet data network gateway further delivers the internet protocol configuration to the station.

In still another aspect thereof the exemplary embodiments of this invention provide an apparatus that includes means for receiving at a packet data network gateway from an S1 a dynamic host configuration protocol request for a station; means for one of creating an internet protocol configuration for the station or for generating another dynamic host configuration protocol request to a dynamic host configuration protocol server to obtain the internet protocol configuration; and means for delivering the internet protocol configuration to the station.

BRIEF DESCRIPTION OF THE DRAWINGS

In the attached Drawing Figures:

FIG. 1F is based on Figure 4 of draft-ietf-v6ops-3gpp-eps-08, J. Korhonen et al., and shows an EPS architecture for 3GPP access.

FIG. 11A shows a format for the multiplexing of flows delivered via the LTE transport radio and flows delivered via the Wi-Fi transport radio to different GTP-u tunnels over the S1 interface.

FIG. 11B shows a format for the multiplexing of flows to a single GTP-u tunnel over the S1 interface.

FIG. 11C shows a format for the multiplexing of flows delivered via the LTE transport radio to a GTP-u tunnel while handling flows delivered via the Wi-Fi transport radio at the IP level to the same transport network.

DETAILED DESCRIPTION

Traffic flow is typically identified by a Source address and a Destination address of the Internet Protocol, by a Destination and/or a Source port and by a traffic class or a differentiated services code point (6-bit DSCP field in an IP header). In the embodiments of this invention these and any other methods of assigning a flow may be applied.

The offloading of 3GPP network traffic to Wi-Fi is considered beneficial, and therefore several offloading architectures, scenarios and solutions are defined and standardized by the 3GPP SA2 since LTE R-8 and up to Rel-11. All of these approaches are based on internet protocol (IP) connectivity level splitting of the traffic flows, thereby making the offloading visible all the way to the core network gateways (PDN GW).

The conventional approaches do not apply any standardized mechanism to control the offload radio at the radio access network level.

For example, 3GPP TS 29.060 V11.0.0 (2011-09) *Technical Specification* 3rd Generation Partnership Project; Technical Specification Group Core Network and Terminals; General Packet Radio Service (GPRS); GPRS Tunnelling Protocol (GTP) across the Gn and Gp interface (Release 11) discusses in Section 9 the GTP-U and in Section 9.1 the GTP-U Protocol Entity as follows.

The GTP-U protocol entity provides packet transmission and reception services to user plane entities in the GGSN, in the SGSN and, in UMTS systems, in the RNC. The GTP-U protocol entity receives traffic from a number of GTP-U tunnel endpoints and transmits traffic to a number of GTP-U tunnel endpoints. There is a GTP-U protocol entity per IP address.

The TEID in the GTP-U header is used to de-multiplex traffic incoming from remote tunnel endpoints so that it is delivered to the User plane entities in a way that allows multiplexing of different users, different packet protocols and different QoS levels. Therefore no two remote GTP-U endpoints shall send traffic to a GTP-U protocol entity using the same TEID value.

The exemplary embodiments of this invention provide in one aspect thereof a PDCP layer functionality for IP packet (equal to PDCP SDU) flow routing to two different radios, namely an LTE radio and a Wi-Fi radio. The routing functionality is able to switch packets of a packet flow to either one of the LTE or Wi-Fi radios at a time. The exemplary embodiments of this invention provide in another aspect thereof an ability for the routing functionality to decide based on the packet flow, for the life time of the packet flow, which of the radio transports (LTE transport or Wi-Fi transport) to use for that flow. The two radios may be used simultaneously to serve parallel packet flows.

The exemplary embodiments of this invention thus provide the PDCP level functionality to handle packet flows over the LTE and Wi-Fi radios. This is a significant advancement over conventional approaches where the packet flows are handled separately in a gateway.

Figure 1A:
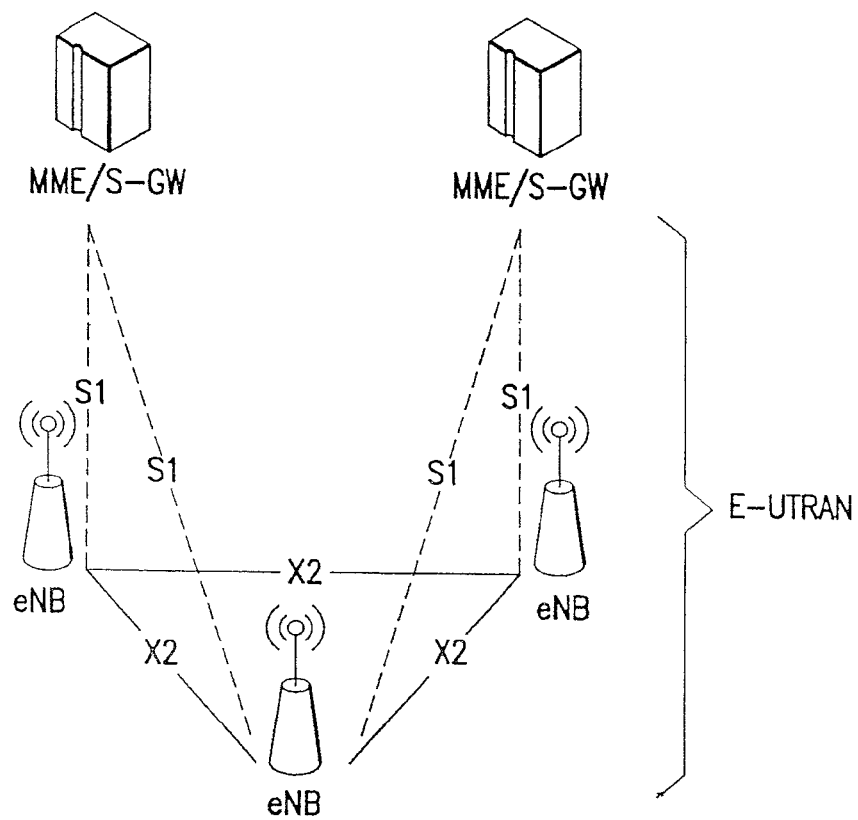
FIG. 1A reproduces Figure 4.1 of 3GPP TS 36.300, and shows the overall architecture of the EUTRAN system.
Figure 1B:
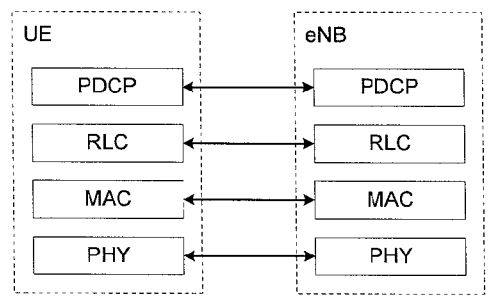
FIG. 1B reproduces Figure 4.3.1-1 of 3GPP TS 36.300, and shows the user-plane protocol stack.
Figure 1C:
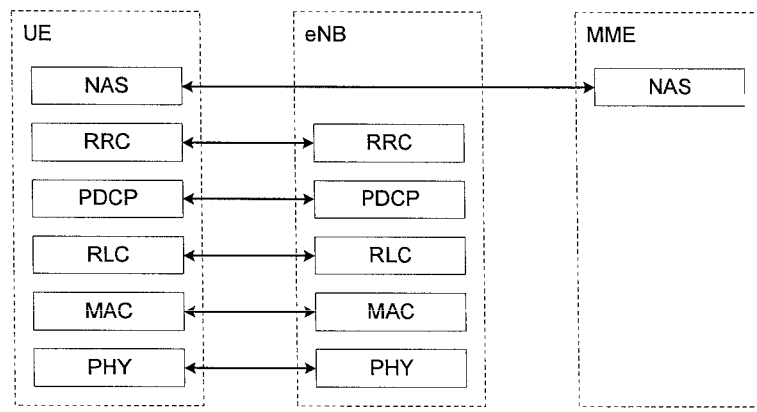
FIG. 1C reproduces Figure 4.3.2-1 of 3GPP TS 36.300, and shows the control-plane protocol stack.

The exemplary embodiments of this invention provide in one aspect thereof an IP-level routing of Wi-Fi packets within the PDCP protocol layer that applies to both the UE PDCP and the eNB PDCP (shown in FIGS. 1B and 1C). The packet flow routing in the PDCP allows transparent operation from the IP stack point of view as only one IP address needs to be assigned in the GGSN/PGW regardless of the use of the two radios. The new functionality in accordance with the embodiments of this invention includes, but need not be limited to: routing within the PDCP; security; and header compression.

It is pointed out that as routing occurs within a network protocol entity, routing could alternatively be referred to as switching.

The coupling of two types of transport radios in a PDCP layer in accordance with the embodiments of this invention can additionally impact S1 multiplexing, GTP-u tunneling, and the EPS bearer.

In some embodiments a modification to the gateway function can be employed.

Figure 2:
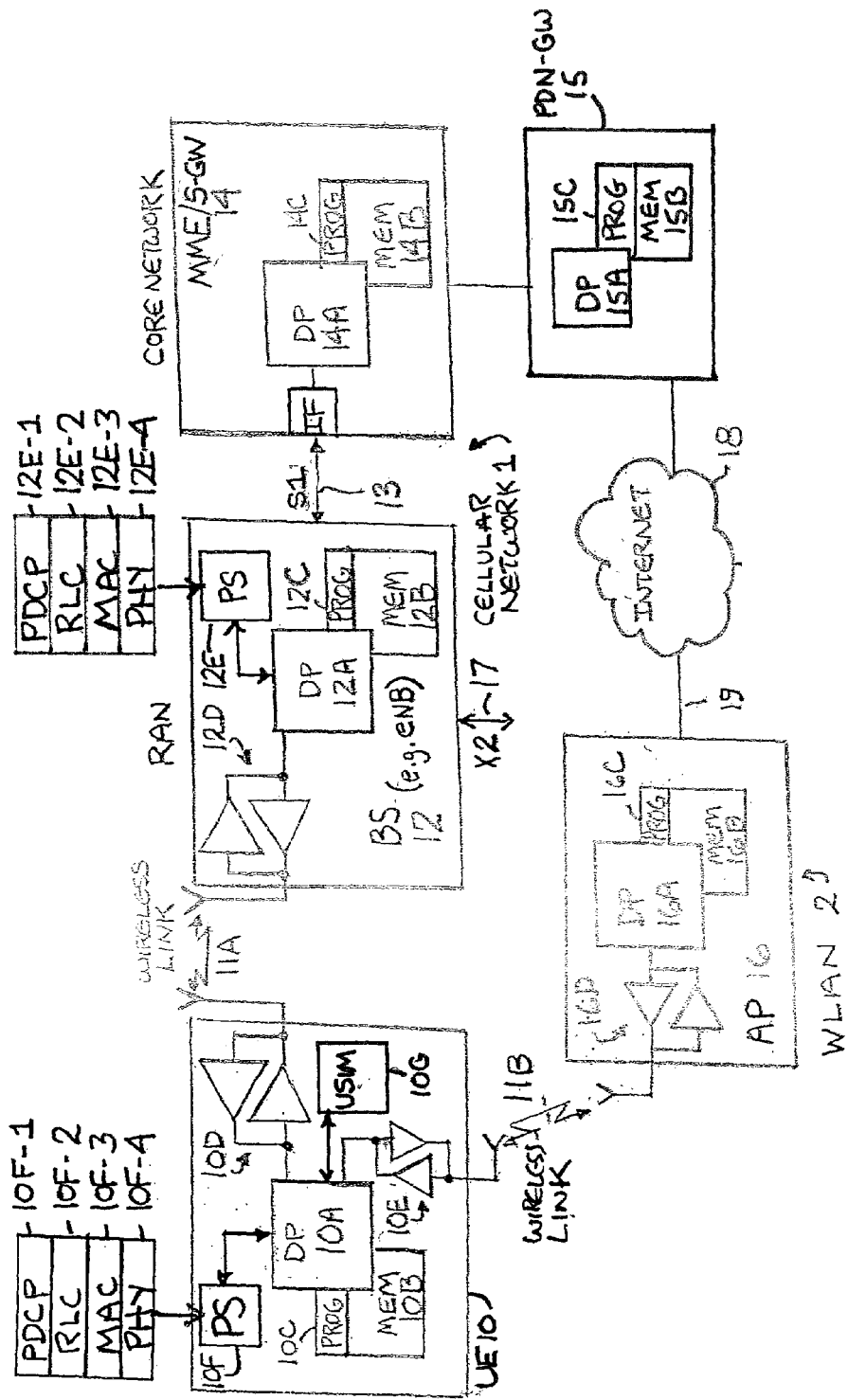
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a first wireless link 11A with an apparatus, such as a mobile communication device which may be referred to as a UE 10, via a network access node, such as a Node B (base station), and more specifically an eNB 12. The wireless network 1 can be implemented as a cellular wireless network, and in some embodiments can be compliant with LTE/LTE-A. The network 1 includes a core network that can include the MME/S-GW 14 functionality shown in FIG. 1A, and which provides connectivity with a further network, such as a telephone network and/or a data communications network (e.g., the Internet).

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) radio transmitter and receiver pair (transceiver) 10D for bidirectional wireless communications with the eNB 12 via one or more antennas FIG. 2 also shows a WLAN network 2 that includes at least one access point (AP) 16, and the UE 10 has at least one further radio transmitter and receiver pair (transceiver) 10E for bidirectional wireless communications with the AP 16 via one or more antennas and a second wireless link 11B. In general, and as is well known, the Wi-Fi transport radio 10E carries IP/Ethernet packets. Note that the transceiver 10E can instead be compatible with a local area evolved 3GPP standard, or a transceiver separate from the WLAN transceiver 10E can be provided for this purpose.

Note also that the UE 10 could be referred to as a UE/STA 10, which implies a device that operates both as a UE of the 3GPP standard and as a STA (station) of the IEEE802.11 standard.

The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the MME/S-GW 14. The path 13 may be implemented as the S1 interface shown in FIG. 1A. The eNB 12 may also be coupled to another eNB via data/control path 17, which may be implemented as the X2 interface shown in FIG. 1A. Note that in some embodiments there could be an X2 interface 17 between the eNB 12 and the WiFi AP 16.

The eNB 12 as well as the AP 16 may separately or jointly be referred to as a Home Evolved NodeB (HeNB), or an office access point, a wireless node, a hotspot, or by any similar names and designators, as examples.

The MME/S-GW 14 includes a controller, such as at least one computer or a data processor (DP) 14A, at least one non-transitory computer-readable memory medium embodied as a memory (MEM) 14B that stores a program of computer instructions (PROG) 14C, and at least one suitable interface (IF) 14D, such as one compliant with the S1 interface shown in FIG. 1A, for conducting bidirectional communications with the eNB 12. The MME/S-GW 14 can be connected to the Internet 18 via a PDN gateway 15.

The implementation of the S-GW separate from, or integrated into, the PDN gateway 15 is a design choice. Whether or not the S-GW is integrated into the PDN gateway 15 the PDN gateway 15 can be assumed to be similarly constructed to include at least one data processor 15A connected with at least one memory 15B that stores computer-executable code 15C configured to implement aspects of this invention.

The AP 16 also includes a controller, such as at least one computer or a data processor (DP) 16A, at least one computer-readable memory medium embodied as a memory (MEM) 16B that stores a program of computer instructions (PROG) 16C, and at least one suitable RF transceiver 16D for communication with the UE 10 via one or more antennas. The AP 12 is coupled via a path 19 to the Internet 18 typically via at least one gateway.

For the purposes of describing the exemplary embodiments of this invention the UE 10 can be assumed to also include a protocol stack (PS) 10F, and the eNB 12 also includes a protocol stack (PS) 12E. For the case where the eNB 12 is LTE and/or LTE-A compliant the PSs 10F and 12E can be assumed to implement the protocol stacks shown in FIGS. 1B and 1C, and thus include the PDCP layer 10F-1, 12F-1 and lower layers (RLC 10F-2, 12E-2, MAC 10F-3, 12E-3 and PHY 10F-4, 12E-4). The PDCP layer 10F-1 is enhanced in accordance with the exemplary embodiments of this invention as described below.

It should be noted that for the left-side protocol stacks in the Figures the technology may be UTRAN or E-UTRAN, for example, and for the right-side protocol stacks in the Figures the technology may be any of Wi-Fi, or a 3GPP-defined local area stack, or a UTRAN protocol stack, or a E-UTRAN protocol stack, for example.

The UE 10 can also include a USIM 10G (e.g., see 3GPP TS 31.111 V10.4.0 (2011-10) *Technical Specification 3$^{rd}$ Generation Partnership Project; Technical Specification Group Core Network and Terminals; Universal Subscriber Identity Module (USIM) Application Toolkit (USAT)* (Release 10), 3GPP TS 31.102 V11.0.0 (2011-10) *Technical Specification 3$^{rd}$ Generation Partnership Project; Technical Specification Group Core Network and Terminals; Characteristics of the Universal Subscriber Identity Module (USIM) application (Release 11)) or some other type of subscriber identity module or functionality.

Figure 1D:
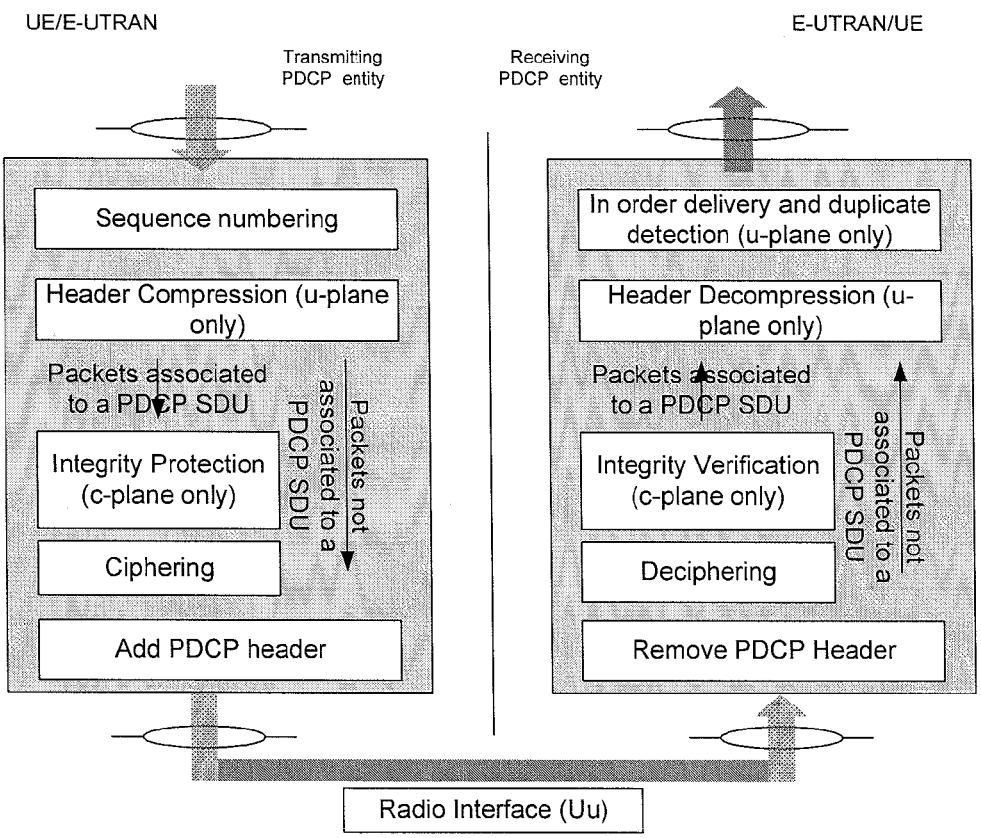
FIG. 1D reproduces Figure 4.2.2.1 of 3GPP TS 36.323 and shows a functional view of the PDCP layer.
Figure 1E:
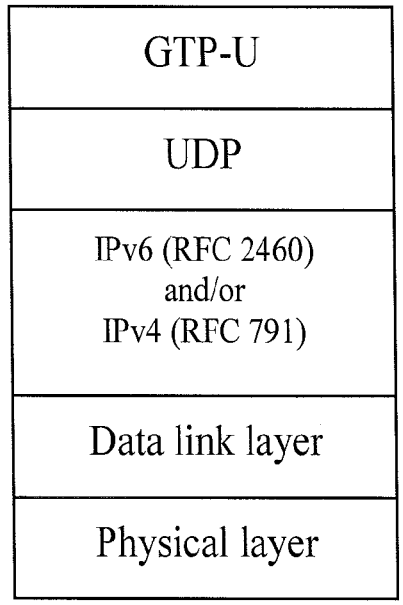
FIG. 1E reproduces Figure 6.1 of 3GPP TS 36.414 and shows the transport protocol stacks over S1.

FIG. 1D referred to above illustrates the functional view of the conventional PDCP layer as shown in 3GPP TS 36.323. An aspect of this invention is to provide modifications to the conventional PDCP layer functionality to enable LTE user plane (u-Plane) and Wi-Fi user plane (u-Plane) packet flows, as will be described below in reference to, for example, FIGS. 3, 4, 6 and 7.

At least the PROGs 10C and 12C are assumed to include program instructions that, when executed by the associated data processor 10A and 12A, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware). The PSs 10F and 10E can be assumed to be implemented at least in part by computer software executable by the DP 10A of the UE 10 and by the DP 12A of the eNB 12.

The various data processors, memories, programs, transceivers and interfaces depicted in FIG. 2 can all be considered to represent means for performing operations and functions that implement the several non-limiting aspects and embodiments of this invention.

In general, the various embodiments of the UE 10 can include, but are not limited to, cellular mobile devices, smartphones, communicators, tablets, laptops, pads, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B, 12B, 14B and 16B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 12A, 14A and 16A may be of any type suitable to the local technical environment, and may include one or more of general purpose computers, special purpose computers, microprocessors, digital signal processors (DSPs) and processors based on multi-core processor architectures, as non-limiting examples.

For convenience, in the following description the (RF) radio transmitter and receiver pair (transceiver) 10D can be referred to as the LTE radio 10D or the LTE transport radio 10D, and the radio transmitter and receiver pair (transceiver) 10E can be referred to as the WiFi radio 10E or the WiFi transport radio 10E. These radios are assumed to include all necessary radio functionality, beyond just the transmitter and receiver per se, such as modulators, demodulators and baseband circuitry as applicable. Also, the reference to an LTE radio implies either LTE (LTE Rel-8) or LTE-A (e.g., Rel. 9, or 10, or higher). Note that by definition an LTE-A compliant radio device can be assumed to be backward-compatible with LTE.

It is pointed out that a particular instance of the UE 10 could have multiple cellular radios of the same or different types (e.g., a UTRAN transport radio and an E-UTRAN transport radio). As such, in the following discussion it should be kept in mind that the exemplary embodiments of this invention are not limited for use with routing a packet flow between one cellular radio and a Wi-Fi radio, but could be used as well to route a packet flow or flows between two or more cellular radios, or between any of said cellular radios and the Wi-Fi radio 10E. Note that in general instead of Wi-Fi the radio 10E could be a cellular radio, and the cellular radio could be UTRAN instead of E-UTRAN.

Discussed first is packet routing and security in accordance with the exemplary embodiments of this invention.

A PDCP protocol header is added to the Ethernet MAC frames of the Wi-Fi transmission. The arrival of an IP packet at the PDCP 10F-1 results in packet inspection to determine the packet flow type and destination of the packet. Depending on the offloading settings, the packet is determined to be routed to the LTE radio (transceiver 10D) or to the Wi-Fi radio (transceiver 10E) for transmission. In a case where USIM 10G based security is used the IP packet is encapsulated to the PDCP PDU including a PDCP Sequence Number. The Sequence Number indexes the security keys. The embodiments of this invention enable the same PDCP Sequence Number string for consecutive IP packets, regardless of whether they are transported via the LTE radio 10D or via the Wi-Fi radio 10E. When the Sequence Number string is the same, the security key sequence is also the same for the packet flow. This enables a fast transition of the packet flow from one radio to another, e.g., from the LTE radio 10D to the Wi-Fi radio 10E and vice versa.

It is also within the scope of the invention to have the Sequence Number strings run independently for the LTE radio 10D and for the Wi-Fi radio 10E. In this case the security key sequences also run independently for the sequence of packets delivered via the LTE radio 10D and for the packets delivered via the Wi-Fi radio 10E. When a packet flow is transferred from the LTE radio 10D to the Wi-Fi radio 10E, the PDCP Sequence Number string can be continuous, and the security key sequence will be continuous.

Note that what is said concerning the in-sequence delivery and duplicate SDU detection above separately applies as well to either one of the in-sequence delivery or duplicate detection without the other function being selected.

In accordance with an aspect of this invention there is provided internal PDCP layer 10F-1 packet routing to the LTE-radio 10D or to the Wi-Fi radio 10E, and the related packet flow switching between the two transport radios 10D, 10E.

Using the Wi-Fi radio 10E for LTE transmission does not impose a security risk in the control plane as all signaling needed for the Wi-Fi transport can be transmitted via LTE RRC signaling. RRC signaling is integrity protected and ciphered by the PDCP 10F-1. In this manner, even if the control plane traffic is transported via the LTE radio 10D, the Wi-Fi transport radio 10E remains available for the user plane traffic. The user plane traffic may be secured by Wi-Fi mechanisms. However, an aspect of this invention is to apply USIM 10G-based security that is bound to the PDCP Sequence Numbers for the Wi-Fi transport as well as the LTE transport. The security mechanism may, for example, be indicated as the cipher suite selection in the extensible authentication protocol (see, for example, RFC 5247, Extensible Authentication Protocol (EAP) Key Management Framework).

Discussed now is header compression in accordance with the exemplary embodiments of this invention.

In a case where PDCP-level operation is applied both for the LTE transport and the Wi-Fi transport the same header compression mechanism as for LTE can be applied for Wi-Fi. For the embodiment where the PDCP Sequence Number string is the same for the packet flow whether transmission is via the LTE radio 10D or via the Wi-Fi radio 10E the same header compression context can be used for the transport. The header decompression, however, assumes an in-sequence delivery of SDUs. This type of in-sequence delivery can be assumed to operate over the LTE transport radio 10D, but would not necessarily operate if packets of the same flow are switched between the LTE and Wi-Fi transport radios 10D, 10E. Therefore, the receiving PDCP (e.g., 12E-1 at the eNB 12) may have in-sequence delivery and duplication detection functions prior to the header decompression. Normally, the in-sequence delivery is provided by the RLC layer 10F-2 below the PDCP layer 10F-1. This approach, however, does not apply to the Wi-Fi transport, because in the exemplary embodiments of this invention the Wi-Fi transport does not use the RLC protocol.

For the embodiment where the PDCP Sequence Number strings are separate for the flows to be transmitted via the LTE radio 10D and the Wi-Fi radio 10E the header compression context is separate for the LTE delivery and for the Wi-Fi delivery. In this case the mutual in-sequence delivery between the LTE radio 10D and the Wi-Fi radio 10E is not required. However, in this case as well there can be provided two completely separate header compression instances and two separate header decompression instances, respectively, which independently operate their respective header compression states. In this case then the in-sequence ordering of flows after having performed the header decompression separately is still possible at the higher network protocol layers, if so preferred.

Figure 3:
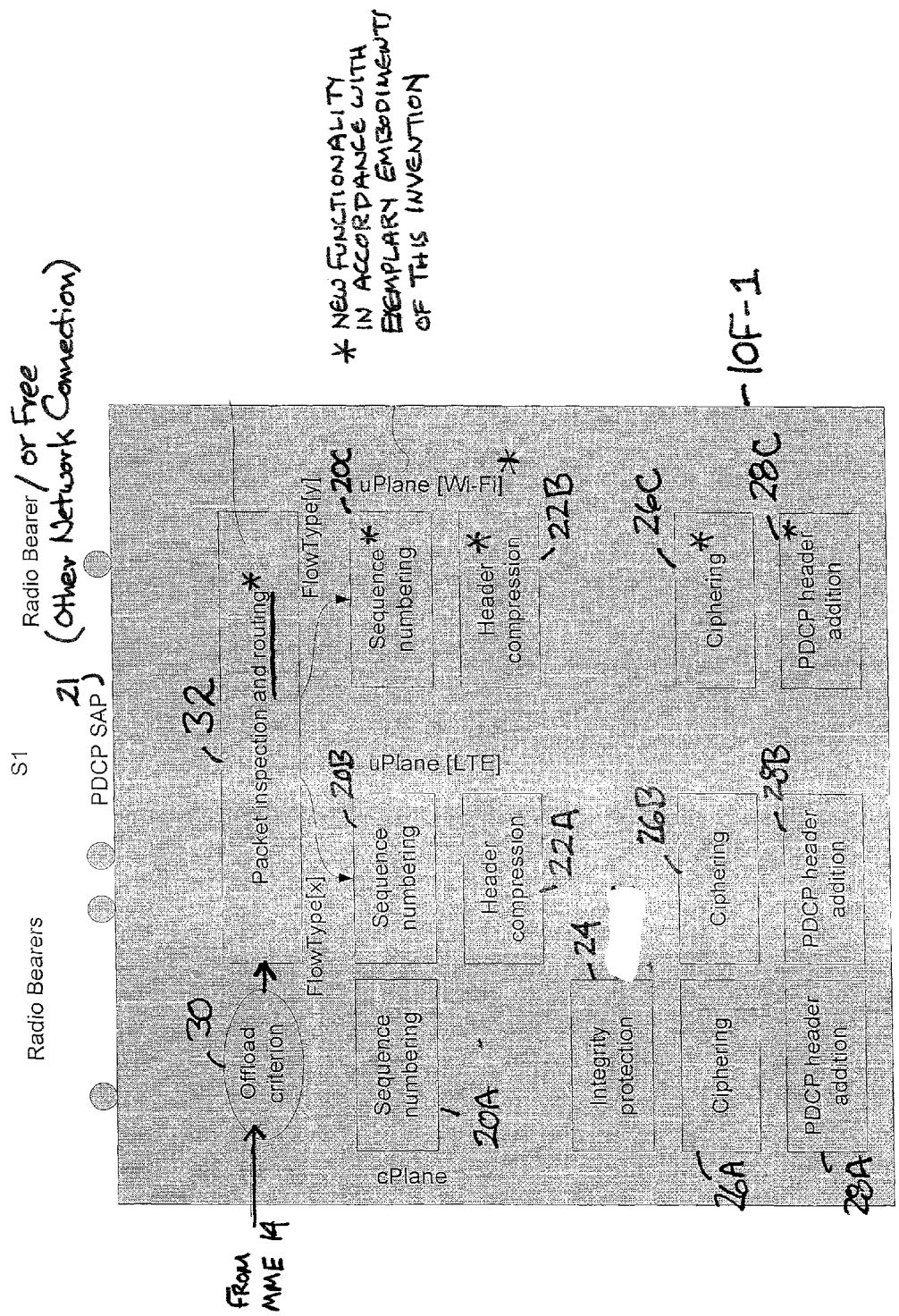
FIG. 3 shows a transmitting entity of an enhanced PDCP layer that includes PDCP entities for the LTE c-Plane, the LTE u-Plane and, in accordance with the embodiments of this invention, the Wi-Fi u-Plane.

In accordance with the foregoing description FIG. 3 shows a transmitting entity of the PDCP layer 10F-1 having an interface embodied as a PDCP service access point (SAP) 21 and PDCP entities for the c-Plane, the LTE u-Plane and, in accordance with the embodiments of this invention, the Wi-Fi u-Plane. Certain of the functionalities can be conventional in nature, e.g., see FIG. 1D. These include LTE c-Plane and u-Plane Sequence numbering functions 20A, 20B, the LTE u-Plane Header compression function 22A, the LTE c-Plane Integrity protection function 24, the LTE c-Plane and u-Plane Ciphering functions 26A, 26B, and the LTE PDCP header addition functions 28A, 28B.

The PDCP layer 10F-1 functionality further includes, in accordance with the exemplary embodiments of this invention, an Offload criterion/criteria function 30, the packet inspection function that includes a routing function 32, and the Wi-Fi u-Plane functions embodied as a Wi-Fi u-Plane Sequence numbering function 20C, a Wi-Fi u-Plane Header compression function 22B, a Wi-Fi u-Plane Ciphering function 26C, and a Wi-Fi u-Plane PDCP header addition function 28C.

Changes are made in the PDCP layer interface in the form of S1 multiplexing, EPS bearers and radio bearers. In accordance with the exemplary embodiments the PDCP layer 10F-1 is enhanced with the internal functions of the packet inspection and routing function 32 to different transport radios (LTE radio 10D or Wi-Fi radio 10E), and controlling the flow switching by the Offload criterion/criteria 30 providing FlowType(x) and FlowType(y).

The Offload criteria 30 could be provided by the MME 14. The MME 14 could derive the offload triggers based on the network load alone or by the behavior of a single UE 10 and its associated active traffic flows. It is also within the scope of this invention to provide for the MME 14 to provide the Offload criterion/criteria 30 based on the user's subscription. The subscription is originally stored in the Home Subscription Server (HSS), from where it can be made available to the MME 14 and further to a Visited registry (VLR) in the case of roaming. The MME 14, if providing the Offload criterion/criteria 30 and trigger thresholds, may perform this function alone or in cooperation with either the S-GW or the PDN-GW 15 or both.

Note that the Offload criterion/criteria 30 could alternatively be provided in a device management object (MO) available from a server, such as a device management server of the LTE operator.

At least one Offload criterion/criteria 30 could be provided as a preconfigured rule to the UE 10.

In general, any offload criterion defined by the Access Network Discovery and Selection Function (ANDSF) Management Object (MO), e.g., 3GPP TS 24.312 V11.0.0 (2011-09) *Technical Specification* 3rd Generation Partnership Project; Technical Specification Group Core Network and Terminals; Access Network Discovery and Selection Function (ANDSF) Management Object (MO) (Release 11), Data Identification in ANDSF (DIDA), e.g., 3GPP TR 23.855 V0.3.0 (2011-10) *Technical Report* 3rd Generation Partnership Project; Technical Specification Group Services and System Aspects; Data Identification in ANDSF (DIDA); (Release 11), or Operator Policies for IP Interface Selection (OPIIS), e.g., 3GPP TR 23.853 V0.3.1 (2011-08) *Technical Report* 3rd Generation Partnership Project; Technical Specification Group Services and System Aspects; Operator Policies for IP Interface Selection (OPIIS); (Release 11) specifications are applicable for use as the Offload criterion/criteria 30 in the PDCP layer 10F-1, as well as any other defined offload criterion.

The Offload criterion/criteria 30 and triggers may be defined per user, per user group, per user type, per subscription class, per network type, per connected APN, per network load, per location, per EPS bearer, per traffic flow type, per traffic flow, per destination of the flow, per source of the flow, and/or per application or per application class, as non-limiting examples.

With respect to the PDCP SAP 21 shown in FIG. 3, in case the radio bearer is defined for the transport over the radio interface for a flow for both the transport over the LTE transport radio 10D or the Wi-Fi transport radio 10E, the radio bearer is mapped with a (one-to-one) relationship to the EPS bearer (discussed in detail below). The EPS bearer is known to have bearer properties, requirements, treatment and parameters according to a standard. In an alternative embodiment, only the flows transported via the LTE transport radio 10D are mapped to the EPS bearer, whereas the flows transported over the Wi-Fi transport radio 10E remain "free", that is they are simply delivered into the network with their IP and Ethernet headers, so that their treatment is entirely left to the transport network without any bearer management. In this case, the transport network may act as a best effort network or it may conditionally apply some priority scheme based on the IP and/or Ethernet headers.

In another embodiment, the transport over the LTE transport radio forms a radio bearer, and the transport over the Wi-Fi transport radio forms a radio bearer, and the radio bearers are mapped within the PDCP layer to the same EPS bearer.

Another embodiment is that the transport over the LTE transport radio forms a radio bearer, and the transport over the Wi-Fi transport radio forms a radio bearer, and the radio bearers are mapped within the PDCP layer to the different EPS bearers.

Figure 4:
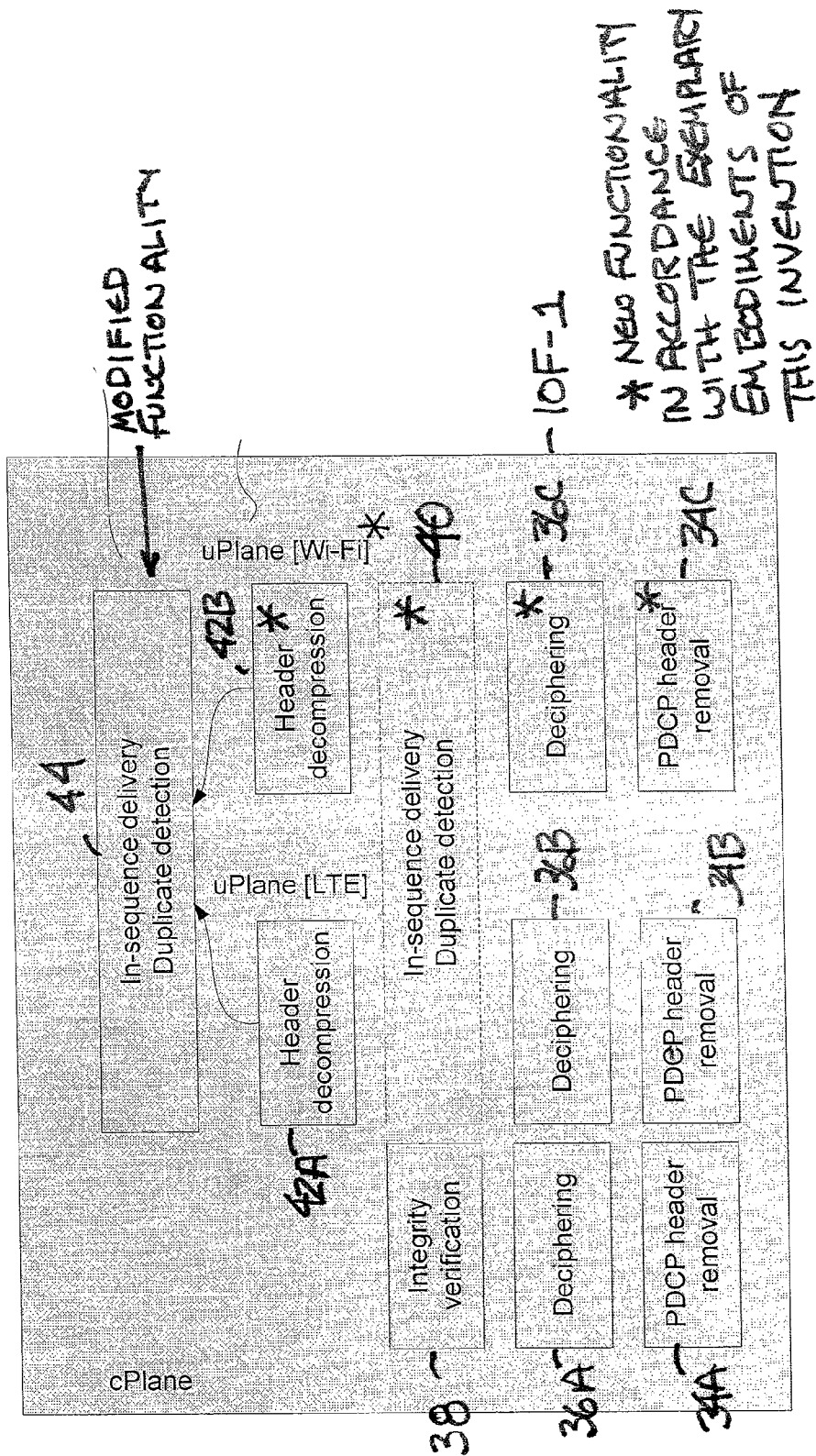
FIG. 4 shows a receiving entity of the enhanced PDCP layer that includes PDCP entities for the LTE c-Plane, the LTE u-Plane and, in accordance with the embodiments of this invention, the Wi-Fi u-Plane.

FIG. 4 shows the PDCP layer 10F-1 (receiving entity) having PDCP entities for the LTE c-Plane, LTE u-Plane and, in accordance with embodiments of this invention, the Wi-Fi u-Plane. The conventional LTE entities include LTE c-Plane PDCP header removal function 34A and u-Plane PDCP header removal function 34B, LTE c-Plane Deciphering function 36A and u-Plane Deciphering function 36B, the c-Plane Integrity verification function 38, and a u-Plane Header decompression function 42A.

The PDCP layer 10F-1 functionality further includes, in accordance with the exemplary embodiments of this invention, Wi-Fi u-Plane PDCP header removal function 34C, Wi-Fi u-Plane Deciphering function 36C, a Wi-Fi u-Plane Header decompression function 42B, and an In-sequence delivery and duplicate detection function 44 that is modified so as to receive packets with decompressed headers from both the LTE u-Plane Header decompression function 42A and the Wi-Fi u-Plane Header decompression function 42B.

As was noted above, header decompression assumes an in-sequence delivery of PDUs. While this type of in-sequence delivery can be assumed to operate over the LTE transport radio 10D, it would not necessarily operate if packets of the same flow are switched between LTE and Wi-Fi transport radios 10D, 10E. Therefore, the receiving PDCP 10F-1 shown in FIG. 4 can be provided with an In-sequence delivery and duplication detection function 40 prior to the header decompression functions 42A, 42B.

Note in this regard that FIG. 4 can be seen to actually depict two embodiments of this invention, where in one embodiment the In-sequence delivery and duplication detection function 40 is located prior to the header decompression functions 42A, 42B, while in another embodiment the In-sequence delivery and duplication detection function 44 is located subsequent to the header decompression functions 42A, 42B.

Further in this regard, the Sequence Numbering is present in the PDCP protocol header that is not compressed. The Header Compressor 22A (FIG. 3) compresses the IP and the network protocol headers, e.g., the IP/UDP/RTP headers, the IP/TCP headers, and some other commonly recognized IP protocol headers, which do not have a meaning while transported over the radio interface. It is possible to recover these headers by the receiving entity's compression context.

In FIG. 4 the purpose of the In sequence delivery duplicate detection function 44 can function in a conventional manner but is also enhanced to include new functionality to arrange in-sequence delivery and/or duplicate detection also between the LTE transport and the Wi-Fi transport. This choice can be optional, whether or not the In-sequence delivery and duplicate detection 44 covers both the transport over LTE and transport over Wi-Fi. In this embodiment, the PDCP Sequence Numbering applies separately for the SDUs transported over the LTE radio 10D and for the SDUs transported over the Wi-Fi radio 10E. One reason to provide the separate In-sequence delivery and/or duplicate detection functions may be to accommodate different latency and throughput observations for the transport over the two radios 10D, 10E.

The In-sequence delivery duplicate detection function 44 can be provided in case the same flow is switched to either transport radio 10D, 10E or to both radios. If there is an in-sequence delivery and/or duplicate detection requirement for both transport radios 10D, 10E, the header de-compression context could be common. In this case, however, the in-sequence delivery and duplicate detection needs to happen before the Header de-compression 42B because only the LTE radio 10D can provide in-sequence delivery at the RLC layer 10F-2, 12F-2 for the PDCP layer 10F-1, 12F-1, whereas the Wi-Fi radio 10E lacks this function. In this embodiment then there should be a common string of PDCP Sequence Numbers for the SDUs whether they are transported over the LTE radio 10D or over the Wi-Fi radio 10E.

Thus, in general the alternatives are: 1) separate strings of PDCP Sequence Numbers, separate Header de-compression entities 42A, 42B and in-sequence delivery and/or duplicate detection above them, or 2) a common string of PDCP Sequence Numbers, a common Header de-compression entity, but in-sequence delivery and/or duplicate detection function below the common Header de-compression entity so that the header de-compression function will operate correctly.

The PDCP functionality shown in FIG. 4 provides for PDCP internal functions of receiving packets from different transport radios (e.g., from the LTE radio 10D and Wi-Fi radio 10E), and handling if needed common in-sequence delivery and duplicate detection for the transport radios.

It should be noted that the illustrated serially-coupled functionality shown in FIGS. 3 and 4 can at any particular point in time all be present and fully operational, or one or more of the illustrated functionalities could be disabled or otherwise removed from the serial chain. For example, in one particular operational mode the Header compression function 22B might be OFF for a particular flow while it may be ON for another flow. In general, the various functionalities may be selectively set to be ON/OFF (e.g., per flow type).

Discussed now are S1 multiplexing, EPS bearers and radio bearers.

Reference with regard to EPS bearers can be made, for example, to "IPv6 in 3GPP Evolved Packet System", draft-ietf-v6ops-3gpp-eps-08, J. Korhonen et al. Sep. 30, 2011. FIG. 1F is based on Figure 4 of this publication and shows the EPS architecture for 3GPP access. Note that the path from the eNB to a local GW can be optional.

As these authors state, in its most basic form the EPS architecture consists of only two nodes on the user plane, a base station and a core network Gateway (GW). The functional split of gateways allows for operators to choose optimized topological locations of nodes within the network and enables various deployment models including the sharing of radio networks between different operators. This also allows independent scaling and growth of traffic throughput and control signal processing. Certain interfaces shown in FIG. 1F are defined as follows.

S5/S8: provides user plane tunneling and tunnel management between the S-GW and the PDN-GW, using GTP (both GTP-U and GTP-C) or PMIPv6 [RFC5213] [3GPP TS.23.402] as the network based mobility management protocol. The S5 interface is used when the PDN-GW and the S-GW are located inside one operator. The S8-interface is used if the PDN-GW and the S-GW are located in different operator domains.

S1-U: provides user plane tunneling and inter eNodeB path switching during handover between eNodeB and S-GW, using the GTP-U protocol (GTP user plane).

S1-MME: reference point for the control plane protocol between the eNB and the MME.

SGi: interface between the PDN-GW and the packet data network. The packet data network may be an operator external public or private packet data network or an intra operator packet data network.

The logical concept of a bearer has been defined to be an aggregate of one or more IP flows related to one or more services. An EPS bearer exists between the UE and the PDN-GW and is used to provide the same level of packet forwarding treatment to the aggregated IP flows constituting the bearer. Services with IP flows requiring a different packet forwarding treatment would therefore require more than one EPS bearer. The UE performs the binding of the uplink IP flows to the bearer while the PDN-GW performs this function for the downlink packets.

Further reference with regard to the EPS bearer can be made to 3 GPP TS 23.401 V10.5.0 (2011-09) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10). Section 4.7.2 "The EPS bearer" and Section 4.7.2.1 "The EPS bearer in general" are of interest. As is stated, for E-UTRAN access to the EPC the PDN connectivity service is provided by an EPS bearer for GTP-based S5/S8, and by an EPS bearer concatenated with IP connectivity between Serving GW and PDN GW for PMIP-based S5/S8. An EPS bearer uniquely identifies traffic flows that receive a common QoS treatment between a UE and a PDN GW for GTP-based S5/S8, and between UE and Serving GW for PMIP-based S5/S8. The packet filters signaled in the NAS procedures are associated with a unique packet filter identifier on a per-PDN connection basis. The EPS bearer traffic flow template (TFT) is the set of all packet filters associated with that EPS bearer.

An EPS bearer can be considered as a level of granularity for bearer level QoS control in the EPC/E-UTRAN. That is, all traffic mapped to the same EPS bearer receive the same bearer level packet forwarding treatment (e.g. scheduling policy, queue management policy, rate shaping policy, RLC configuration, etc.). To provide different bearer level packet forwarding treatment requires providing separate EPS bearers.

Figure 5A:
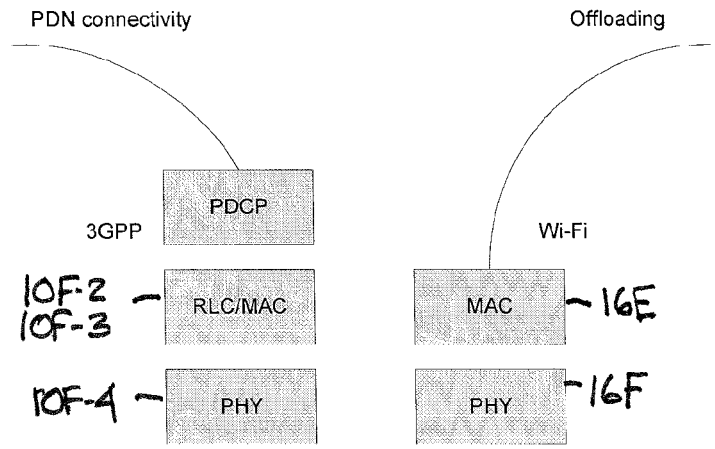
FIG. 5A shows alternatives of conventional connectivity for LTE and Wi-Fi operation.

The aspects of various alternatives of S1 multiplexing, EPS bearers and radio bearers for the LTE and Wi-Fi transport radios are addressed in FIG. 5A.

FIG. 5A shows alternatives of connectivity for LTE and Wi-Fi operation. In a conventional manner there are independent operations, where LTE has PDN connectivity over the S1 GTP-u tunnels for the EPS bearer using the conventional PDCP layer (as in FIG. 1D) and the underlying RLC, MAC and PHY layers 10F-2, 10F-3, 10F-4, while Wi-Fi uses its own IP connectivity and associated MAC layer 16E and PHY 16F.

Figure 5B:
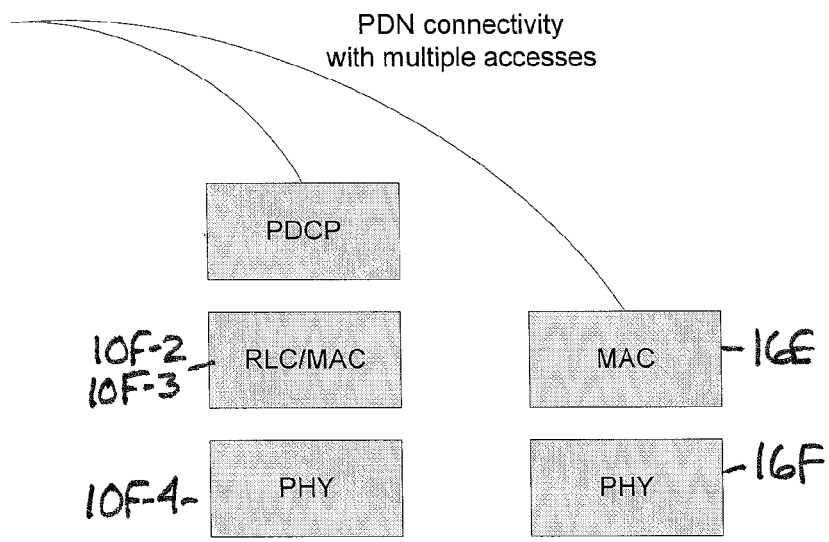
FIG. 5B shows further alternatives of conventional connectivity for LTE and Wi-Fi operation.

FIG. 5B shows further alternatives of connectivity for LTE and Wi-Fi operation. In this case there is shown PDN connectivity with multiple accesses over the S1 GTP-u tunnels for the EPS bearer.

In FIGS. 5A and 5B (an in FIGS. 6 and 7 described below) the PDN connectivity paths curving to the left can be assumed to terminate at the PDN GW 15, while the paths curving to the right can be assumed to terminate at another gateway, e.g., at the local gateway shown in FIG. 1F.

It can be noted that in FIG. 1F there would typically be an S1-interface (more precisely S1-u interface) between the eNB and the Local GW. However, other interfaces could be used, such as possibly an X2-interface. For the eNB connectivity to the Local GW, this interface could also be un-defined in terms of the 3GPP standard. For example, the interface could be an Internet/Ethernet interface, particularly so for the non-3GPP flows. In a case where the Local gateway inherits any of the features of a PDN gateway for the non-3GPP flows, this interface could also be, for example, one of a 2a-, 2b-, or 2c-interface, according to 3GPP TS 23.402 V11.0.0 (2011-09) Technical Specification 3rd Generation Partnership Project; Technical Specification Group Services and System Aspects; Architecture enhancements for non-3GPP accesses (Release 11).

The Wi-Fi transport radio 10E may be defined to be a radio bearer of its own. In the case of PDCP routing, the PDCP 10F-1 needs to determine which radio bearer, LTE 10D or Wi-Fi 10E, it uses for the transport of a given packet flow. Even in this case the EPS bearer may be common. If the same EPS bearer is used for both LTE and Wi-Fi transport, the EPS bearer requirements should be met by both radios 10D and 10E. In this case the packets of the LTE radio 10D and the packets of the Wi-Fi radio 10E will be tunneled to the same GTP-u tunnel. In this case the handover from the eNB 12/AP 16 to another eNB 12 is preferably made a common procedure with common path switching. It is possible that in the target eNB 12 the EPS bearer is served by a LTE radio bearer only. In a case where the EPS bearer is common, the PDCP layer 10F-1 needs to be able to route traffic from/to a single EPS bearer from two different radio bearers. This is basically a simple routing functionality and does not impose specific constraints, other than accommodating for example the different Block Error Rate (BLER) and delay characteristics of the two radios 10D, 10E.

If the EPS bearers for LTE transport and Wi-Fi transport are separate, their bearer parameters may also differ. In this case it is still possible to multiplex LTE traffic and Wi-Fi traffic to the same S1-interface. In the case where the EPS bearers are separate they will also use different GTP-u tunnels. In this case, the handover procedures and path switching may be different for the LTE EPS bearer and for the Wi-Fi EPS bearer. It is also possible that the EPS bearers terminate at different PDN gateways if so determined by the MME 14. The MME 14 is assumed to initiate the GTP-u tunnel establishment. The S1 multiplexing and making the EPS aware of the Wi-Fi transport has the benefit of the network being able to control the EPS bearer requirements for the Wi-Fi traffic separately, as well as setting the criteria (Offload criteria 30 of FIG. 3) for switching the traffic to the LTE transport or to the Wi-Fi transport, respectively. In this case the RRC can control switching on and off the Wi-Fi radio 10E according to the current need.

As the S1 interface is capable of operating over any L1/L2 transport protocols and IP, it is also possible that the Wi-Fi transport is multiplexed to the LTE traffic on the IP layer. In this case LTE may apply the S1 protocol and GTP-u tunneling headers, whereas Wi-Fi may apply IP transport, both over the same, common L2 switched network, e.g. Ethernet, or xDSL or ATM.

The S1 multiplexing depends on at least whether the LTE and Wi-Fi connections have the same IP address. 3GPP SA2 has defined multiple PDN connectivity so that the UE 10 can have different IP addresses per PDN connection. This can be utilized by the embodiments of this invention so that the LTE and Wi-Fi use different PDN connections with different IP addresses. In this case they would also use independent GTP-u tunnels.

Another embodiment is that the LTE and Wi-Fi use the same PDN connection and the same IP address, and offer different radio bearer transport (LTE transceiver 10D, Wi-Fi transceiver 10E) for the packet flows.

In yet another embodiment the two radios 10D, 10E have different IP addresses and are served by different gateways.

For example, the LTE radio 10D is connected via the EPS bearer to the PDN gateway 15 and the Wi-Fi radio 10E are connected to the local domain of a local breakout gateway.

In an alternative embodiment, the LTE and Wi-Fi may be considered not to define their radio bearers separately, but the Wi-Fi instead functions in a manner analogous to a carrier aggregation Secondary cell (Scell). In this case the connection is fully controlled by the LTE signaling radio bearer, acting on the Primary cell (Pcell). In the case where the Wi-Fi acts as a Scell, the Pcell is still enabled to guarantee that the bearer requirements are met, even in the case where Wi-Fi radio 10E is used for transport. In this scenario the Wi-Fi radio 10E may function as an extension carrier. The use of an extension carrier for offloading is well suited for packet flows of bulky, high volume data where, for example, the bearer requirements are not too stringent. Also, some high rate streaming such as HD media or 3D media flows could be offloaded to the extension carrier.

Figure 10:
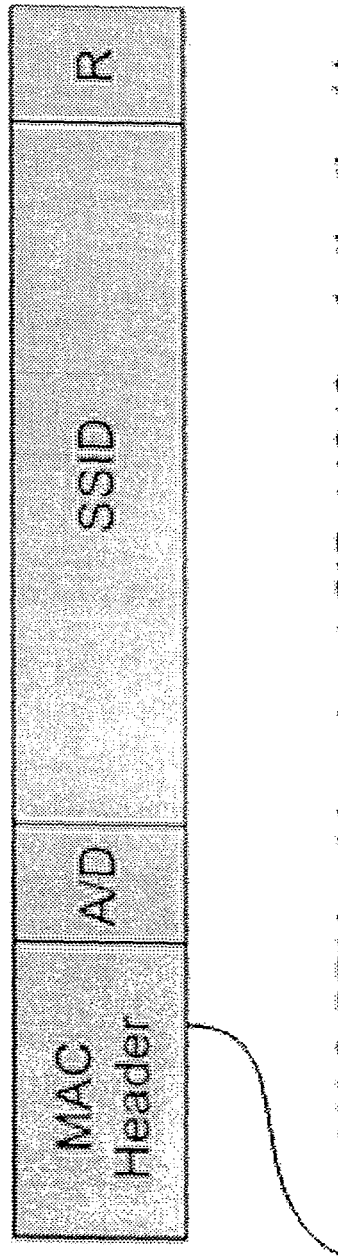
FIG. 10 illustrates one possible and non-limiting MAC Control Element (MAC CE) format for aggregating Wi-Fi carriers to LTE transmission for offloading purposes.

Once the UE/STA 10 is associated to the Wi-Fi access point 16 and it becomes feasible to offload traffic to the Wi-Fi carrier (the wireless link 11B in FIG. 1), the signaling of the Wi-Fi carrier activation/deactivation can be accomplished as shown in FIG. 10. FIG. 10 illustrates one possible and non-limiting MAC Control Element (MAC CE) format for aggregating Wi-Fi carriers to LTE transmission for offloading purposes. A/D is the activation/deactivation flag, SSID is the serving node identity and R is reserved for the future use.

Thus, an aspect of this invention provides the new MAC CE that is defined for the Wi-Fi carrier. The MAC CE includes the flag (A/D) for noting activation "1" or deactivation "0" of a Wi-Fi carrier. The flag in this exemplary embodiment is not per component carrier, as in the LTE system, but is instead per service identity (Serving Set Identity, SSID) or (Basic Service Set Identity, BSSID), base station identity (BSID), or another identity of the access point 16. In this manner, and once activated, it becomes feasible for the Wi-Fi to change its operating frequency within the ISM band and/or to aggregate its Wi-Fi transmission to one or more of the Wi-Fi carriers as defined by recent IEEE 802.11n and 802.11ac enhancements of the IEEE 802.11 specification.

In this embodiment one special logical channel identity (LCID) is reserved to identify the aggregation of Wi-Fi carriers (e.g., LCID 11010). This logical channel identity uniquely separates the format of this MAC CE.

The format of the Wi-Fi carrier aggregation activation/deactivation is different from the LTE aggregation. In LTE aggregation the activation/deactivation is signaled per component carrier and no eNB identity is given. In the Wi-Fi aggregation in accordance with an aspect of this invention the single activation/deactivation flag (A/D) can be used along with an identity of the aggregating service node or the aggregating service network.

Further with regard to S1 multiplexing, FIG. 11A shows a format for the multiplexing of flows delivered via the LTE transport radio 10D and flows delivered via the Wi-Fi transport radio 10E to different GTP-u tunnels over the S1 interface 13. Each GTP-u tunnel is identified by an associated TEID.

FIG. 11B shows a format for the multiplexing of flows to a single GTP-u tunnel over the S1 interface 13, regardless of whether the flow is delivered over the LTE transport radio 10D fully, or over the Wi-Fi transport radio 10E fully, or if brief switching between the LTE and Wi-Fi transport radios occurs, or whether there are some flows fully delivered via the LTE transport radio 10D and other flows are fully delivered via the Wi-Fi transport radio 10E. Multiple flows can be multiplexed to the same GTP-u tunnel, e.g., when they form aggregated EPS bearers. In a case where the EPS bearer requirements are different for the flows, the different flows are multiplexed to different GTP-u tunnels according to FIG. 11A.

FIG. 11C shows a format for the multiplexing of flows delivered via the LTE transport radio 10D to a GTP-u tunnel while handling flows delivered via the Wi-Fi transport radio 10E at the IP level to the same transport network. The same transport network (e.g. Ethernet) may be used at least partly along the common transmission path of the GTP-u tunnel and IP routing whether or not their end-point addresses finally terminate at the same network address.

In FIGS. 11A-11C GTP-u/TEID means the full GTP-u tunnel header, which may include destination and source addresses and further definitions of the GTP-u tunnel. In addition, in FIG. 11C IP means the full IP header with the source and destination addresses and possible other options for the routing and prioritization of the traffic, as well as the IP version.

It is noted that FIGS. 11A-11C describe the consequence of having the routing function in the PDCP 10F-1 to the multiplexing over the S1 interface 13. The S1 interface 13 is the fixed-transport network interface of the eNB 12 for the UE 10 traffic to the PDN gateway 15. FIGS. 11A-11C therefore show the headers for tunneling and multiplexing over the transport network (S1-interface).

Figure 6:
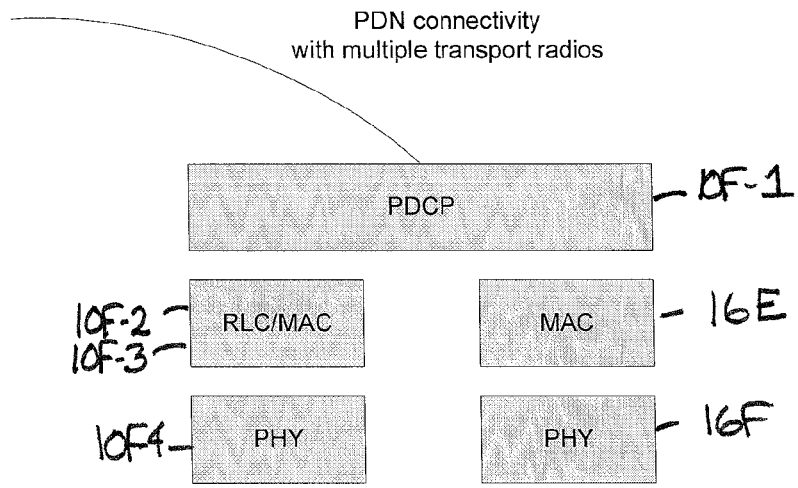
FIGS. 6 and 7 each shows an aspect of alternatives of connectivity for LTE and Wi-Fi operation in accordance with the exemplary embodiments of this invention, where LTE and Wi-Fi share the common enhanced PDCP layer of FIGS. 3 and 4.

FIG. 6 shows an aspect of alternatives of connectivity for LTE and Wi-Fi operation in accordance with the exemplary embodiments of this invention, where LTE and Wi-Fi share the common PDCP 10F-1. As such, the enhanced PDCP layer 10F-1 is capable of using the two transport radios 10D, 10E according to the Offload criteria 30 shown in FIG. 3. The network interface of the PDCP layer 10F-1 provides S1 multiplexing, GTP-u tunneling and EPS bearer for the packet flows over the LTE transport radio 10D and over the Wi-Fi transport radio 10E.

Figure 7:
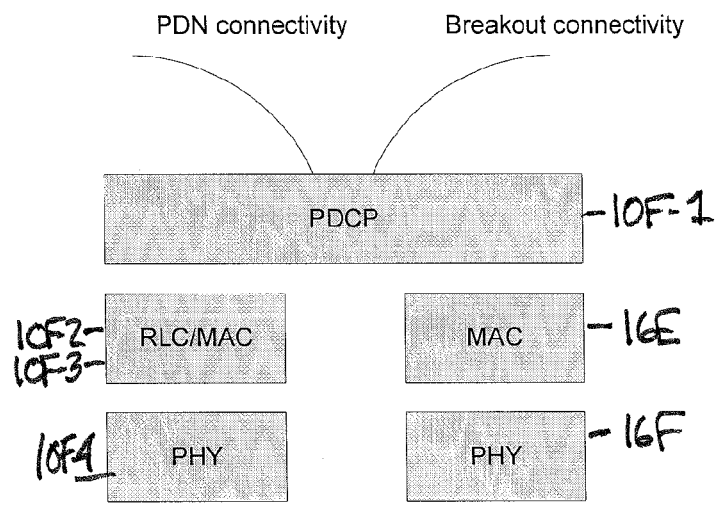

FIG. 7 shows another alternative of connectivity for LTE and Wi-Fi operation in accordance with the exemplary embodiments of this invention, where LTE and Wi-Fi share the common PDCP 10F-1 and use the two transport radios 10D, 10E according to the Offload criteria 30. In this case the network interface of the PDCP layer 10F-1 provides IP multiplexing (over any L1/L2) of the LTE EPS bearer in the GTP-u tunnels with the IP packets of the Wi-Fi flows. The UE 10 has separate IP address interfaces for the LTE and Wi-Fi flows. The Wi-Fi IP address may be from the PDN gateway or from a local subnet dynamic host configuration protocol (DHCP) server.

Discussed now are modifications that can be made to the gateway functionality.

A conventional PDN gateway receives Bearer Setup requests and is able to assign the UE 10 an IP address from its subnet pool of IP addresses, or alternatively the PDN gateway may execute a DHCP request on behalf of the UE 10 to obtain the IP address for the UE 10 from a DHCP-server. Reference in this regard can be made to FIG. 8.

Figure 8:
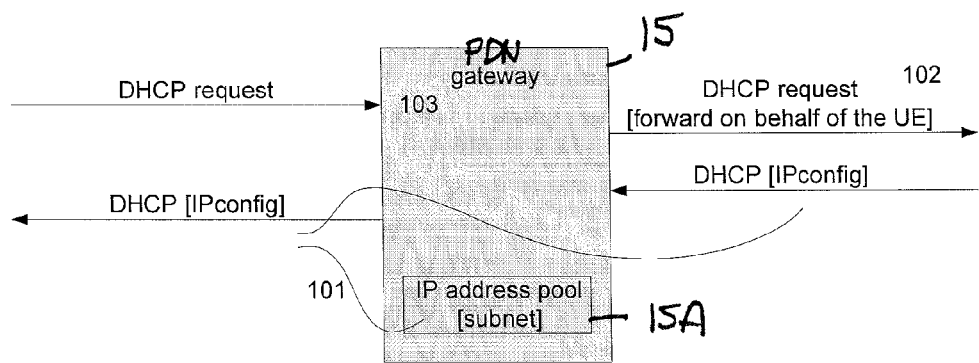
FIG. 8 shows a gateway function for EPS bearer setup and UE IP address allocation.

FIG. 8 shows the PDN gateway 15 function for the EPS bearer setup and UE IP address allocation. In FIG. 8 those functions labeled 101 and 102 represent alternative conventional mechanisms. However, the function labeled 103 is a new function in accordance with the exemplary embodiments of this invention.

A conventional Wi-Fi station (Wi-Fi STA) creates DHCP requests to obtain an IP address. The DHCP server responds to the request and delivers the IP host configuration to the Wi-Fi station. If the Wi-Fi station is expected to acquire its own IP address it can obtain it from the local subnet by the DHCP procedure in a conventional fashion. However, if the Wi-Fi station is connected to the PDN gateway 15 according to an embodiment of the invention, the eNB 12/AP 16 may have to deliver the UE 10 (operating as a Wi-Fi STA) created DHCP-request to the PDN gateway 15. This type of operation requires a new functionality at the PDN gateway 15 so that it can receive an incoming DHCP request and service the request.

More specifically, the conventional MME 14 receives EPS bearer setup requests and communicates to the PDN-gateway 15 and the serving eNB 12 the EPS bearer setup with the GTP-tunnel end-point identifiers (TEID). The PDN-gateway 15 may create IP-address(es) for the requesting UE 10 from a pool 15A of IP addresses (function 101 in FIG. 8), or the PDN-gateway 15 may execute a DHCP-request on behalf of the UE 10 to acquire an IP address for the UE 10 from a DHCP server in the Internet (function 102 in FIG. 8). Therefore, if the Wi-Fi legacy functionality is not modified in view of the embodiments of this invention the Wi-Fi STA (UE 10) will still create a DHCP request to obtain an IP address from the DHCP server in the same subnet. If there is no DHCP server present in the subnet, there exist protocols to acquire an IP address from a more distant DHCP server, if so allowed.

In an embodiment of this invention, where the legacy Wi-Fi bootstrapping operation is not changed, the DHCP-request will be originated by the Wi-Fi STA (the UE/STA 10) in a conventional fashion; however the eNB 12/AP 16 will multiplex the DHCP request packet to the S1 interface 13 to be received by the PDN gateway 15. In this case then the PDN gateway 15 needs to be able to handle incoming DHCP requests (103 in FIG. 8) and act as the DHCP server for the Wi-Fi STA DHCP request. The PDN gateway 15 will either create the IP-configuration itself or will service the DHCP-request by generating another DHCP request to a DHCP server located in the Internet.

In another embodiment of the invention, Wi-Fi operation is changed to a compatible bearer model so that the WiFi STA does not perform bootstrapping and does not create a DHCP request. Instead the WiFi STA (UE 10) uses the IP address given by the conventional EPS bearer setup procedure.

In any of the embodiments above with respect to FIG. 8 the MME 14 need not be involved in a case where the S1-interface 13 is already set up between the serving eNB 12 and the packet data network gateway 16 of the UE/STA 10 for the communication, for example, via the LTE transport radio 10D. In another embodiment, when the S1-interface 13 is not yet set up, or is not yet set up for the Wi-Fi transport radio 10E, the MME 14 may be involved in delivering the dynamic host configuration protocol request to a selected packet data network gateway 16. Even in this case, however, MME need not be in the data path of further communications between the eNB 12 and the packet data network gateway 16.

In a situation where the LTE radio 10D and the Wi-Fi radio 10E are connected to different PDN gateways, they can execute separate connectivity procedures for the user-plane. In this case, the control plane operation is similar to that of conventional carrier aggregation. Carrier aggregation may occur in the same eNB 12/AP 16, or if there is an X2 interface 17 in between the radio nodes eNB 12/AP 16, the carrier aggregation functions in a similar manner to conventional inter-site carrier aggregation principles.

RRC signaling for the carrier aggregation measurements, and for the carrier aggregation configurations, are presented in 3GPP TS 36.331 V10.3.0 (2011-09) *Technical Specification* 3rd Generation Partnership Project; Technical Specification Group Radio Access Network; Evolved Universal Terrestrial Radio Access (E-UTRA); Radio Resource Control (RRC); Protocol specification (Release 10).

Activation and deactivation of component carriers listed in the carrier aggregation configuration are presented in 3GPP TS 36.321 V10.3.0 (2011-09) *Technical Specification* 3rd Generation Partnership Project; Technical Specification Group Radio Access Network; Evolved Universal Terrestrial Radio Access (E-UTRA); Medium Access Control (MAC) protocol specification (Release 10).

As was shown in FIG. 10, an aspect of this invention is to provide a mechanism to enable the activation/deactivation of Wi-Fi carriers by the use of the MAC CE.

However, if the carrier aggregation occurs in the same eNB 12/AP 16, the user-plane may be handled by the single enhanced PDCP 10F-1.

If there is an X2 interface 17 in between the radio nodes eNB 12 and AP 16, the sharing of the PDCP layer 10F-1 may not be needed, and the LTE Wi-Fi can use conventional carrier aggregation in the control plane. Even in this case, Wi-Fi security may use USIM 10G based security algorithms by selecting a conventional 3GPP cipher suite, but the keys are not bound to the PDCP sequence numbers. Alternatively there can be a new PDCP layer also in the Wi-Fi AP 16. This approach, however, is not according to legacy Wi-Fi AP implementation.

There are a number of advantages that can be realized by the use of the exemplary embodiments of this invention. For example, the tight integration of the Wi-Fi radio transport to LTE enables better coordination of the use of the LTE and Wi-Fi radios 10D, 10E, allows offloading to occur in an efficient manner, enables use of unlicensed spectrum and enables power efficient device operation. An additional advantage that is gained is faster packet flow switching between radios and also more efficient and less complex handover procedures. The impact of LTE and Wi-Fi operation at the network side can be reduced as compared to conventional offloading by IP flow mobility procedures. Furthermore, the exemplary embodiments enable the use of the two radios for radio interface offloading in a manner that is transparent to the UE 10 and the network IP connectivity layer. That is, there is no need to assign separate IP addresses for the WiFi flows and LTE flows, as is the case with some conventional offloading approaches from LTE Rel-8 and onwards.

Based on the foregoing it should be apparent that the exemplary embodiments of this invention provide a method, apparatus and computer program(s) to enable an efficient use of a cellular and a Wi-Fi radio of a device to at least enable efficient flow switching and offloading of cellular packet traffic.

Figure 9A:
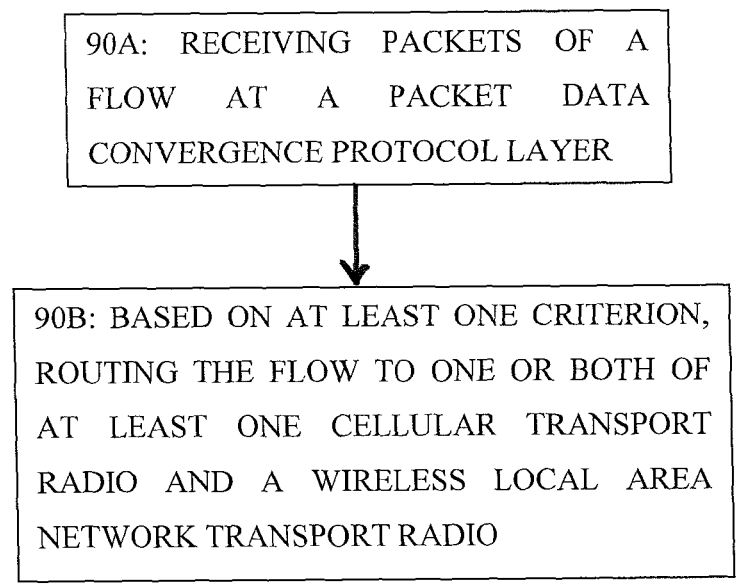
FIGS. 9A and 9B are each a logic flow diagram that illustrates the operation of a method, and a result of execution of computer program instructions embodied on a computer readable medium, in accordance with the exemplary embodiments of this invention.

FIG. 9A is a logic flow diagram that illustrates the operation of a method, and a result of execution of computer program instructions, in accordance with the exemplary embodiments of this invention. In accordance with these exemplary embodiments a method performs, at Block 90A, a step of receiving a packet flow at a packet data convergence protocol layer. At Block 90B there is a step performed, based on at least one criterion, of routing the flow to one or both of at least one cellular transport radio and a wireless local area network transport radio.

Figure 9B:
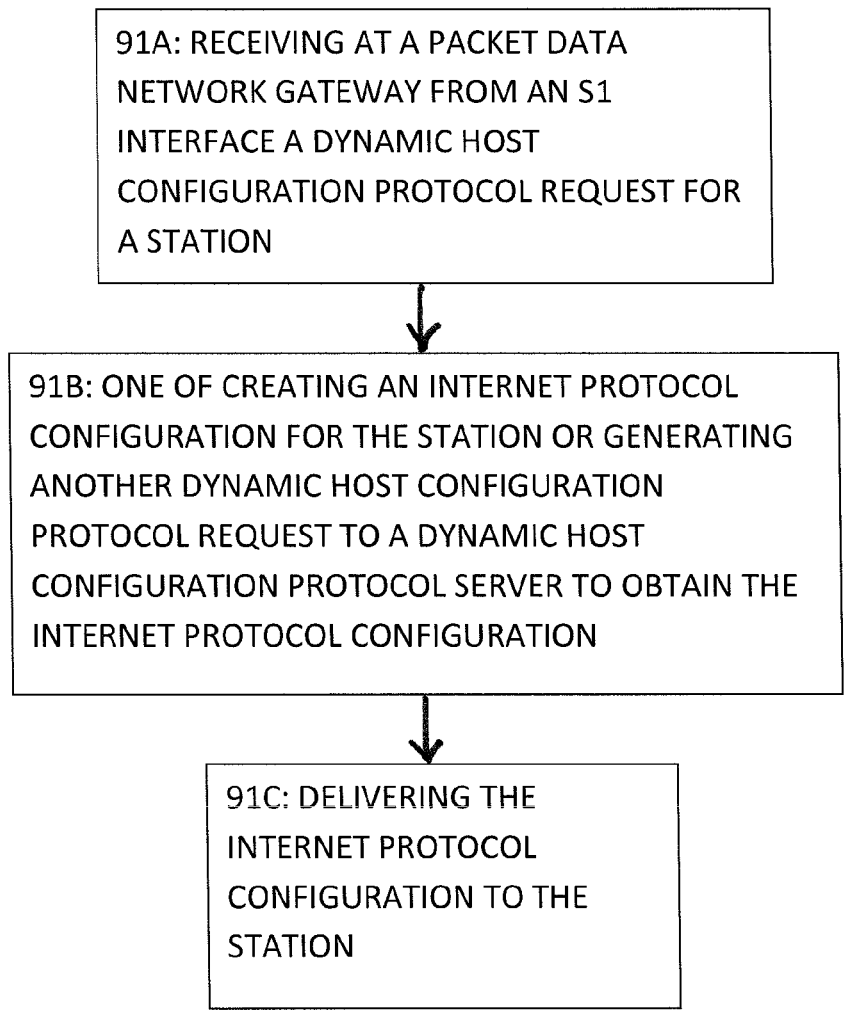

FIG. 9B is a logic flow diagram that illustrates the operation of a method, and a result of execution of computer program instructions, in accordance with the exemplary embodiments of this invention. In accordance with these exemplary embodiments a method performs, at Block 91A, a step of receiving at a packet data network gateway from an S1 interface a dynamic host configuration protocol request for a station. At Block 91B there is a step of one of creating an internet protocol configuration for the station or generating another dynamic host configuration protocol request to a dynamic host configuration protocol server to obtain the internet protocol configuration. At Block 91C there is a step of delivering the internet protocol configuration to the station.

The various blocks shown in FIGS. 9A and 9B may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN LTE, LTE-A and IEEE 802.11 type systems it should be appreciated that the exemplary embodiments of this invention are not limited for use with only these particular types of wireless communication system, and that they may be used to advantage in other wireless communication systems.

It should be noted that the terms "connected," "coupled," or any variant thereof; mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the various names assigned to different devices, bearers, interfaces, protocol stack layers, PDCP functionalities, entities and the like are not intended to be limiting in any respect, as these various devices, bearers, interfaces, protocol stack layers, PDCP functionalities and entities may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
receiving packets of a flow at a packet data convergence protocol (PDCP) layer, wherein the PDCP layer includes at least one cellular transport radio in a first eNB associated with an LTE c-Plane, and an LTE u-Plane and a wireless local area network transport radio; and
based on at least one criterion, routing the flow internal to the packet data convergence protocol layer to one or both of the at least one cellular transport radio and the wireless local area network transport radio,
wherein the wireless local area network transport radio provides offload capacity and is included in a different eNB to the first eNB, and
wherein a same PDCP sequence number string is configured to be used in both instances for consecutive IP packets of a packet flow for transporting the IP packets via the at least one cellular transport radio and the wireless local area network transport radio.

2. The method of claim 1, where the at least one cellular transport radio is compliant with a long term evolution (LTE) standard and the wireless local area network transport radio is compliant with at least one of an IEEE 802.11 (Wi-Fi) standard, LTE, or a local area evolved 3GPP standard.

3. The method of claim 1, where a security key sequence is also the same for the packet flow.

4. The method of claim 1, where a first security key sequence is used for the first packet flow and where a second security key sequence is used for the second packet flow.

5. The method of claim 1, where a first PDCP sequence number string is used for consecutive IP packets of a first packet flow transported via the at least one cellular transport radio, and where a second PDCP sequence number string is used for consecutive IP packets of a second packet flow transported via the wireless local area network transport radio.

6. The method of claim 1, where the at least one criterion is provided from a mobility management entity.

7. The method of claim 1, where the at least one criterion is based on one or both of network load and traffic flows of a user device that comprises the at least one cellular transport radio and wireless local area network transport radio.

8. The method of claim 1, where the at least one cellular transport radio functions as a primary cell and where the wireless local area network transport radio functions as a secondary cell having an extension carrier.

9. An apparatus, comprising:
at least one data processor; and
at least one memory including computer program code, where the at least one memory and computer program code are configured, with the at least one data processor, to cause the apparatus at least to
receive packets of a flow at a (PDCP) layer, wherein the PDCP layer includes at least one cellular transport radio in a first eNB associated with an LTE c-Plane, and an LTE u-Plane and a wireless local area network transport radio and,
based on at least one criterion, to route the flow internal to the packet data convergence protocol layer to one or both of the at least one cellular transport radio and the wireless local area network transport radio,
wherein the wireless local area network transport radio provides offload capacity and is included in a different eNB to the first eNB, and
wherein a same PDCP sequence number string is configured to be used in both instances for consecutive IP packets of a packet flow for transporting the IP packets via the at least one cellular transport radio and the wireless local area network transport radio.

10. The apparatus of claim 9, where the at least one cellular transport radio is compliant with a long term evolution (LTE) standard and the wireless local area network transport radio is compliant with at least one of an IEEE 802.11 (Wi-Fi) standard, LTE, or a local area evolved 3GPP standard.

11. The apparatus of claim 9, where a security key sequence is also the same for the packet flow.

12. The apparatus of claim 9, where a first security key sequence is used for the first packet flow and where a second security key sequence is used for the second packet flow.

13. The apparatus of claim 9, where a first PDCP sequence number string is used for consecutive IP packets of a first packet flow transported via the at least one cellular transport radio, and where a second PDCP sequence number string is used for consecutive IP packets of a second packet flow transported via the wireless local area network transport radio.

14. The apparatus of claim 9, where the at least one criterion is provided from a mobility management entity.

15. The apparatus of claim 9, where the at least one criterion is based on one or both of network load and traffic flows of a user device that comprises the at least one cellular transport radio and wireless local area network transport radio.

16. The apparatus of claim 9, where the at least one cellular transport radio functions as a primary cell and where the wireless local area network transport radio functions as a secondary cell having an extension carrier.

17. A computer program product comprising at least one computer-readable non-transitory storage medium bearing computer program code embodied therein for use with a computer, the computer program code comprising code for:
receiving packets of a flow at a (PDCP) layer, wherein the PDCP layer includes at least one cellular transport radio in a first eNB associated with an LTE c-Plane, and an LTE u-Plane and a wireless local area network transport radio; and
based on at least one criterion, routing the flow internal to the packet data convergence protocol layer to one or both of the at least one cellular transport radio and the wireless local area network transport radio,
wherein the wireless local area network transport radio provides offload capacity and is included in a different eNB to the first eNB, and
wherein a same PDCP sequence number string is configured to be used in both instances for consecutive IP packets of a packet flow for transporting the IP packets via the at least one cellular transport radio and the wireless local area network transport radio.

18. The computer program product according to claim 17, where a security key sequence is also the same for the packet flow.

19. The computer program product according to claim 17, where a first security key sequence is used for the first packet flow and where a second security key sequence is used for the second packet flow.

20. The computer program product according to claim 17, where a first PDCP sequence number string is used for consecutive IP packets of a first packet flow transported via the at least one cellular transport radio, and where a second PDCP sequence number string is used for consecutive IP packets of a second packet flow transported via the wireless local area network transport radio.

* * * * *